US009565513B1

(12) United States Patent
Malek et al.

(10) Patent No.: US 9,565,513 B1
(45) Date of Patent: Feb. 7, 2017

(54) SYSTEMS AND METHODS FOR PROVIDING LONG-RANGE NETWORK SERVICES TO SHORT-RANGE WIRELESS DEVICES

(71) Applicant: Thirdwayv, Inc., Irvine, CA (US)

(72) Inventors: Bola Malek, Laguna Niguel, CA (US); Faisal AlToukhy, Irvine, CA (US)

(73) Assignee: Thirdwayv, Inc., Irvine, CA (US)

( * ) Notice: Subject to any disclaimer, the term of this patent is extended or adjusted under 35 U.S.C. 154(b) by 44 days.

(21) Appl. No.: 14/635,528

(22) Filed: Mar. 2, 2015

(51) Int. Cl.
*H04W 4/00* (2009.01)

(52) U.S. Cl.
CPC .................... *H04W 4/008* (2013.01)

(58) Field of Classification Search
CPC ....................................... H04W 4/008
USPC ............................... 455/41.2, 41.3
See application file for complete search history.

(56) References Cited

U.S. PATENT DOCUMENTS

| | | | | |
|---|---|---|---|---|
| 6,820,049 B1 * | 11/2004 | Monroe | .............. | H04L 12/2602 340/905 |
| 6,900,737 B1 * | 5/2005 | Ardalan | .................... | H04Q 9/00 340/870.02 |
| 6,922,559 B2 * | 7/2005 | Mohammed | .......... | H04W 12/06 455/418 |
| 6,985,087 B2 * | 1/2006 | Soliman | ................. | G01D 4/004 340/870.02 |
| 7,027,808 B2 * | 4/2006 | Wesby | ................... | G06Q 40/00 340/853.1 |
| 7,209,049 B2 * | 4/2007 | Dusenberry | ............. | H04Q 9/00 340/870.02 |
| 7,411,491 B2 * | 8/2008 | Klabunde | ............ | A61B 5/0006 340/539.1 |
| 7,430,602 B2 * | 9/2008 | Babbar | ................. | H04W 76/02 709/225 |
| 7,597,250 B2 * | 10/2009 | Finn | ........................ | B60R 25/25 235/375 |
| 7,701,324 B2 * | 4/2010 | Lin | ......................... | G08C 17/00 340/286.02 |
| 7,881,656 B2 * | 2/2011 | Khedouri | .......... | G06F 17/30094 455/3.01 |
| 7,885,644 B2 * | 2/2011 | Gallagher | ............... | H04W 4/22 455/414.1 |
| 7,937,089 B2 * | 5/2011 | Smetters | ................ | G08C 17/00 455/422.1 |
| 7,953,423 B2 * | 5/2011 | Gallagher | ............. | H04W 36/14 455/422.1 |
| 8,090,842 B2 * | 1/2012 | Schirar | .................. | G08C 17/02 455/41.1 |
| 8,161,191 B2 * | 4/2012 | Flammer | ................. | H04L 45/00 340/870.01 |
| 8,319,658 B2 * | 11/2012 | Conant | .................. | G06Q 10/10 340/870.01 |

(Continued)

*Primary Examiner* — Hai V Nguyen
(74) *Attorney, Agent, or Firm* — Snell & Wilmer LLP

(57) ABSTRACT

Systems and methods relating to providing long-range network service to short-range wireless devices are disclosed. The system includes a short-range wireless device, a remote server, and a long-range wireless device for establishing a data path between the short-range wireless device and the remote server. The system performs a described method by using the short-range wireless device to alternate the transmission and concealment of an incitation signal so as to allow the long-range wireless device to establish and maintain the data path without any intervention, supervision, or inputs from a human user.

20 Claims, 11 Drawing Sheets

(56) References Cited

U.S. PATENT DOCUMENTS

| | | | |
|---|---|---|---|
| 8,346,209 B2 * | 1/2013 | Dababneh | G01D 4/004 340/10.41 |
| 8,350,717 B2 * | 1/2013 | Brennan, Jr. | G01D 4/004 340/870.02 |
| 8,462,693 B2 * | 6/2013 | Montemurro | H04W 48/08 370/328 |
| 8,504,099 B2 * | 8/2013 | Corson | H04W 40/244 370/338 |
| 8,515,433 B2 * | 8/2013 | Vaswani | H04L 45/00 370/237 |
| 8,522,019 B2 * | 8/2013 | Michaelis | G07C 9/00039 370/310 |
| 8,600,830 B2 * | 12/2013 | Hoffberg | G06Q 30/0207 705/14.71 |
| 8,676,953 B2 * | 3/2014 | Koch | G06Q 30/0206 370/535 |
| 8,782,190 B2 * | 7/2014 | Koch | G06F 17/30976 307/32 |
| 8,832,428 B2 * | 9/2014 | Ota | H04W 12/04 713/153 |
| 8,856,323 B2 * | 10/2014 | Enns | H04L 29/08729 709/202 |
| 8,880,126 B2 * | 11/2014 | Fu | H04W 48/18 370/331 |
| 8,957,784 B2 * | 2/2015 | Myoung | H04Q 9/00 324/114 |
| 9,001,787 B1 * | 4/2015 | Conant | H04W 36/04 370/328 |
| 9,153,001 B2 * | 10/2015 | Walter | G06Q 50/06 |
| 9,184,778 B2 * | 11/2015 | Tan | H04B 1/3822 |
| 9,282,383 B2 * | 3/2016 | Carr | H04Q 9/00 |
| 2001/0007815 A1 * | 7/2001 | Philipsson | G06Q 20/32 455/41.2 |
| 2002/0171897 A1 * | 11/2002 | Cho | H04B 10/1125 398/121 |
| 2003/0076241 A1 * | 4/2003 | Middleton | H04Q 9/02 340/870.02 |
| 2003/0174067 A1 * | 9/2003 | Soliman | G01D 4/004 340/870.02 |
| 2004/0028023 A1 * | 2/2004 | Mandhyan | G01D 21/00 370/351 |
| 2004/0113810 A1 * | 6/2004 | Mason, Jr. | G01D 4/004 340/870.02 |
| 2004/0116140 A1 * | 6/2004 | Babbar | H04W 76/02 455/517 |
| 2004/0266449 A1 * | 12/2004 | Smetters | G08C 17/00 455/452.1 |
| 2005/0037747 A1 * | 2/2005 | Geary | H04L 63/10 455/422.1 |
| 2005/0222933 A1 * | 10/2005 | Wesby | G06Q 40/00 705/36 R |
| 2005/0245240 A1 * | 11/2005 | Balasuriya | H04L 29/06027 455/414.1 |
| 2005/0287950 A1 * | 12/2005 | Helden | H04M 1/7253 455/41.2 |
| 2006/0178131 A1 * | 8/2006 | Huotari | H04L 63/062 455/410 |
| 2006/0219776 A1 * | 10/2006 | Finn | B60R 25/25 235/380 |
| 2006/0234631 A1 * | 10/2006 | Dieguez | H04W 76/023 455/41.2 |
| 2007/0055640 A1 * | 3/2007 | Dababneh | G01D 4/004 705/412 |
| 2007/0140157 A1 * | 6/2007 | Fu | H04W 48/18 370/318 |
| 2007/0194945 A1 * | 8/2007 | Atkinson | G08C 17/02 340/13.26 |
| 2007/0238448 A1 * | 10/2007 | Gallagher | H04W 4/22 455/414.2 |
| 2007/0277230 A1 * | 11/2007 | Hawkins | H04L 63/08 726/4 |
| 2008/0160909 A1 * | 7/2008 | Khedouri | G06F 17/30094 455/3.06 |
| 2008/0188180 A1 * | 8/2008 | Rahja | H04W 48/18 455/41.2 |
| 2008/0200165 A1 * | 8/2008 | Sharma | H04W 48/18 455/426.1 |
| 2008/0220878 A1 * | 9/2008 | Michaelis | A63F 13/12 463/42 |
| 2008/0222711 A1 * | 9/2008 | Michaelis | G07C 9/00039 726/7 |
| 2008/0244148 A1 * | 10/2008 | Nix, Jr. | H04L 41/0856 710/313 |
| 2008/0268816 A1 * | 10/2008 | Wormald | H04W 68/00 455/412.2 |
| 2009/0102681 A1 * | 4/2009 | Brennan, Jr. | G01D 4/004 340/870.03 |
| 2010/0178864 A1 * | 7/2010 | Chow | G06Q 30/0283 455/3.06 |
| 2010/0215023 A1 * | 8/2010 | Hoole | H04W 36/0083 370/332 |
| 2010/0235285 A1 * | 9/2010 | Hoffberg | G06Q 20/401 705/75 |
| 2010/0246391 A1 * | 9/2010 | Immendorf | H04W 28/10 370/230 |
| 2010/0317420 A1 * | 12/2010 | Hoffberg | G06Q 30/0207 463/1 |
| 2011/0046792 A1 * | 2/2011 | Imes | F24F 11/0086 700/278 |
| 2011/0161419 A1 * | 6/2011 | Chunilal | G06F 17/30867 709/204 |
| 2011/0276396 A1 * | 11/2011 | Rathod | G06F 17/30867 705/14.49 |
| 2012/0011559 A1 * | 1/2012 | Miettinen | G06F 21/31 726/1 |
| 2012/0026005 A1 * | 2/2012 | Myoung | H04Q 9/00 340/870.02 |
| 2012/0103095 A1 * | 5/2012 | Wada | G01C 19/5607 73/514.34 |
| 2013/0027219 A1 * | 1/2013 | Myoung | H04Q 9/00 340/870.03 |
| 2013/0132854 A1 * | 5/2013 | Raleigh | G06F 3/0482 715/738 |
| 2013/0217332 A1 * | 8/2013 | Altman | H04H 60/90 455/41.2 |
| 2014/0128001 A1 * | 5/2014 | Imes | H04L 67/10 455/41.2 |
| 2014/0129942 A1 * | 5/2014 | Rathod | H04N 21/44222 715/720 |
| 2014/0141711 A1 * | 5/2014 | Baker | H04W 40/02 455/11.1 |
| 2014/0225747 A1 * | 8/2014 | Abts | H04Q 9/00 340/870.11 |
| 2014/0244104 A1 * | 8/2014 | Tan | H04B 1/3822 701/36 |
| 2014/0362761 A1 * | 12/2014 | Dankberg | H04L 67/325 370/312 |
| 2015/0121470 A1 * | 4/2015 | Rongo | H04L 41/0813 726/4 |
| 2015/0178630 A1 * | 6/2015 | Miyazaki | G06N 5/047 706/48 |
| 2015/0195099 A1 * | 7/2015 | Imes | G05B 15/02 700/275 |
| 2015/0208320 A1 * | 7/2015 | Alexander | H04W 4/008 370/254 |
| 2015/0268670 A1 * | 9/2015 | Nies | A01G 25/16 700/282 |
| 2015/0281931 A1 * | 10/2015 | Kim | G06Q 10/063 455/404.2 |
| 2015/0288604 A1 * | 10/2015 | Boudreaux | G01S 5/0294 370/328 |
| 2015/0312023 A1 * | 10/2015 | Rice | H04L 7/0041 375/371 |
| 2016/0014591 A1 * | 1/2016 | Sekaran | H04W 8/02 455/432.1 |

* cited by examiner

SYSTEMS AND METHODS FOR PROVIDING LONG-RANGE NETWORK SERVICES TO SHORT-RANGE WIRELESS DEVICES

BACKGROUND

Each year, billions of consumer and enterprise devices are connected to the Internet to develop a dynamic infrastructure coined as the Internet-Of-Things (IOT). Mainstream access to the Internet typically requires a WiFi system equipped with an Ethernet connection or a mobile network such as a 3G/4G network. A device adopting any one of these access solutions is thus equipped with long-range wireless capabilities. For the upcoming trend of ubiquitous devices that enable the IOT however, short-range wireless devices, such as Bluetooth Low Energy (BLE) enabled devices, are becoming more prevalent. The popularity of these short-range wireless devices can be attributed to their relatively low energy consumption and relatively broad geographic reach.

Unfortunately, these short-range wireless devices are not equipped with any long-range wireless capabilities, so they cannot be connected to the Internet without the help of any long-range wireless device (e.g., a 3G/4G enabled smart phone or a laptop computer with WiFi capabilities). In the event that the short-range wireless device has access to a long-range wireless device, the short-range wireless device lacks the control to initiate the Internet connection. Often, supervisions and interventions of a human user are required before the long-range wireless device can provide any network service to the short-range wireless device. As such, the process for connecting the short-range wireless device to the Internet can be onerous and inconvenient for a human user. Thus, there is a need for systems and methods that provide long-range network service to short-range wireless devices without requiring a substantial amount of human inputs or supervisions.

SUMMARY

The present disclosure describes systems and methods related to providing long-range network services to short-range wireless devices by using a long-range wireless device without requesting any inputs, supervision, or intervention from a human user.

According to an aspect of the present disclosure, a described system includes a short-range wireless device having a short-range wireless transceiver (e.g., a BLE transceiver), a memory and a processor circuitry coupled with the memory. The memory is configured to store a subscription identifier for inciting a long-range wireless device, which has been subscribed to perform a network service for one or more designated short-range wireless devices. The processor circuitry is configured to generate an incitation signal based on the subscription identifier. During a notification period, the processor circuitry is configured to direct a short-range transceiver to transmit the incitation signal for declaring a subscription zone. And during a reset period, which is distinctive from and alternating with the notification period, the processor circuitry is configured to direct the short-range transceiver to conceal the incitation signal to renounce the subscription zone. The concealment of the incitation signal can be achieved in multiple ways. In one implementation, for example, the processor circuitry can direct the short-range transceiver to conceal the incitation signal by stopping its transmission. In another implementation, for example, the processor circuitry can direct the short-range transceiver to conceal the incitation signal by reducing its transmission amplitude or altering its transmission frequency so as to render it undetectable by the long-range wireless device.

According to another aspect of the present disclosure, a described system includes a nontransitory computer-readable medium that stores a set of programming instructions, upon the compilation and/or execution of which will cause a short-range wireless device to perform a method for initiating a long-range wireless device to commence a connection procedure. The method includes the step of retrieving a subscription identifier for inciting a long-range wireless device, which has been subscribed to perform a network service for one or more designated short-range wireless devices. The method also includes the step of generating an incitation signal based on the subscription identifier. The method further includes the steps of transmitting the incitation signal during a notification period to periodically declare a subscription zone while halting the incitation signal during a reset period to periodically renounce the subscription zone. Because the notification period is distinctive from and alternates with the reset period, the method alternates the declaration and renunciation of the subscription zone.

In one implementation, the service provided by the long-range wireless device includes using a background thread to establish a data path between a server and a client short-range wireless device located within a proximity of the subscription zone and relay data from the client short-range wireless device to the server via the established data path. The client short-range wireless device can be the short-range wireless device that transmits the incitation signal in one implementation. Alternatively, the client short-range wireless device can be a peer device of the short-range wireless device that transmits the incitation signal in another implementation. To optimize the connection efficiency, the notification period and the reset period can be calibrated to track the operations of the long-range wireless device. In one implementation, for example, the notification period is calibrated to track a service policy of the long-range wireless device for performing the service within the subscription zone. In another implementation, for example, the reset period can be calibrated to track a reentry policy of the long-range wireless device for exiting and reentering the subscription zone.

In addition to the subscription identifier, the memory of the short-range wireless device can store a set of auxiliary subscription identifiers, which can be used for inciting the long-range wireless device subscribed to perform the same network service for one or more designated short-range wireless devices. The processor circuitry of the short-range wireless device is configured to retrieve an auxiliary identifier to generate an auxiliary incitation signal. During the reset period, the processor circuitry is configured to direct the short-range transceiver to transmit the auxiliary incitation signal to declare an auxiliary subscription zone. And during the notification period, the processor circuitry is configured to direct the short-range transceiver to conceal the auxiliary incitation signal to renounce the auxiliary subscription zone. Multiple auxiliary subscription identifiers can be used to generate multiple auxiliary incitation signals. The transmissions of each auxiliary incitation signal distinctively declare an auxiliary subscription zone. Each auxiliary incitation signal however, can be transmitted at a different transmission interval, such that the calibration of a plurality of transmission intervals can dynamically track the reentry policy of the long-range wireless device.

According to yet another aspect of the present disclosure, a described system includes a nontransitory computer-readable medium that stores a set of programming instructions, upon the compilation and/or execution of which will cause a long-range wireless device to perform a method for establishing a data path between a short-range wireless device and a server. The method includes the steps of receiving an incitation signal via a short-range transceiver of the long-range wireless device and retrieving an identifier from the incitation signal. The method also includes the step of comparing the retrieved identifier against a subscription registry associated with a short-range wireless device. The method further includes the step of autonomously communicating with the short-range wireless device via the short-range transceiver if and only if the subscription registry includes a subscription identifier matching with the retrieved identifier.

In one implementation, the method may further include the step of deactivating an application registered with the subscription identifier before receiving the incitation signal. Accordingly, the autonomously communication step may further include the steps of: activating a background thread of the application while keeping a foreground thread of the application deactivated upon locating the matching subscription identifier in the subscription registry; transmitting, through the background thread, a scan request signal via the short-range transceiver; and establishing, through the background thread, a short-range wireless connection with the short-range wireless device upon detecting a valid scan respond signal transmitted from the short-range wireless device. In an alternative implementation, the autonomously communication step may further include the steps of: locating, in the subscription registry, the subscription identifier matching with the retrieved identifier; upon the subscription identifier is located, generating a scan request signal without human intervention; transmitting the scan request signal via the short-range transceiver; receiving, via the short-range transceiver, a scan respond signal transmitted by the short-range wireless transceiver; verifying the scan respond signal with the server via a remote connection; and relaying data from the short-range wireless device to the server if and only if the server validates the scan respond signal.

The described systems and techniques can be implemented in electronic circuitry, computer hardware, firmware, software, or in combinations of them, such as the structural means disclosed in this specification and structural equivalents thereof. This can include at least one computer-readable medium embodying programming instructions operable to cause one or more data processing apparatus (e.g., a signal processing device including a programmable processor or an application specific integrated circuit) to perform the disclosed operations. Thus, program implementations can be realized from a disclosed method, system, or apparatus; and apparatus implementations can be realized from a disclosed system, computer-readable medium, or method. Similarly, method implementations can be realized from a disclosed system, computer-readable medium, or apparatus; and system implementations can be realized from a disclosed method, computer-readable medium, or apparatus.

DRAWING DESCRIPTIONS

Like reference symbols in the various drawings indicate like elements.

DETAILED DESCRIPTION

Figure 1:
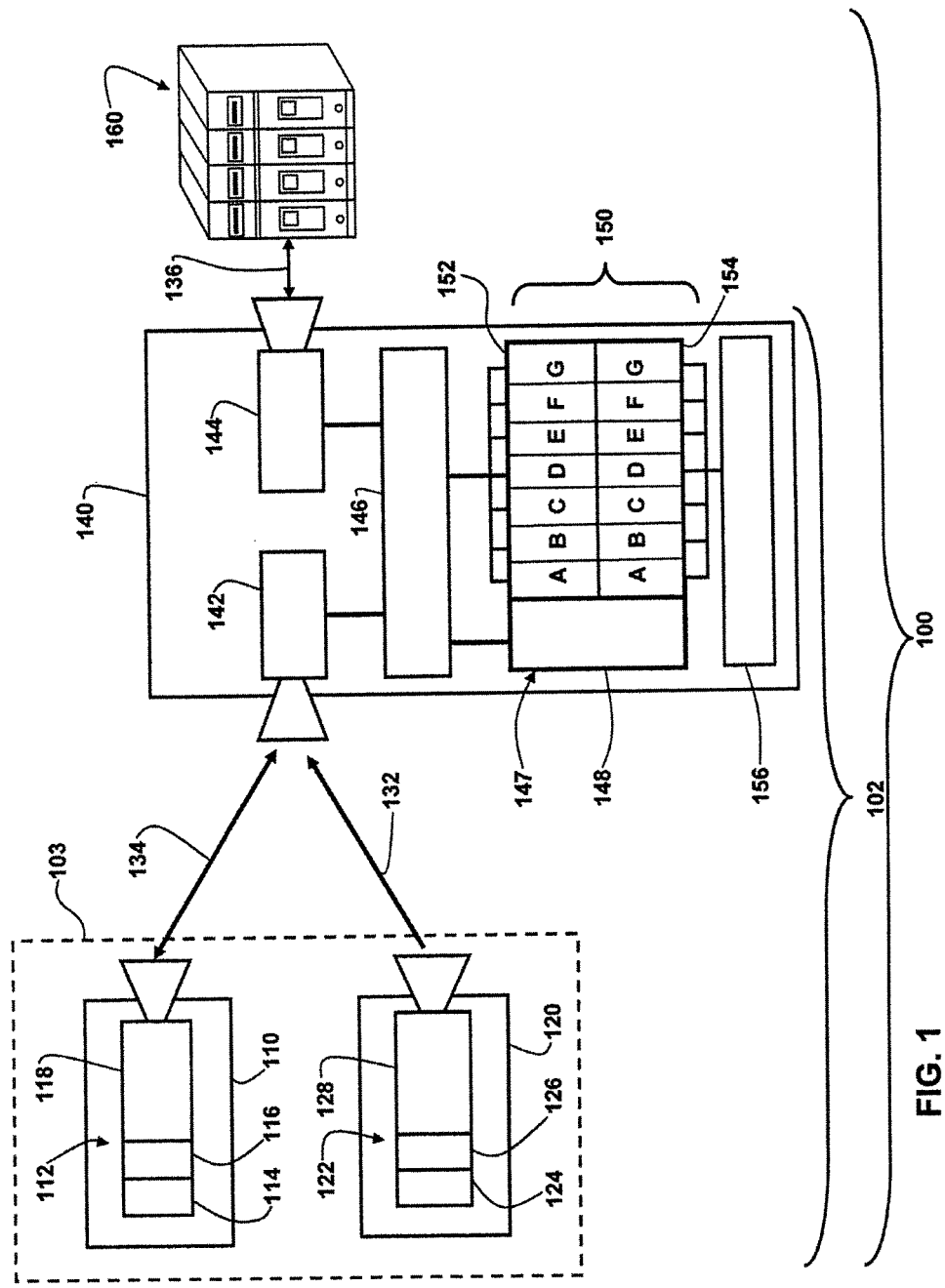
FIG. 1 shows an example of a remote communication system according to one aspect of the present disclosure.

The subject matter described herein includes details and implementations of a system for providing long-range network services to one or more short-range wireless (SRW) devices. Consistent with the disclosure of these implementations, an SRW device is a physical device that lacks long-range transmission capabilities (e.g., WiFi, 3G, and/or 4G capabilities). Nevertheless, the SRW device is equipped with a short-range transceiver that is capable of transmitting and receiving short-range wireless signals conforming to one or more short-range wireless communication protocols, which include but are not limited to Bluetooth, Bluetooth Low Energy, ZigBee, IEEE 802.15, 6LoWPAN, Sub-GHz Wireless Radio, NFC, and RFID.

In general, SRW devices are powered by low capacitance energy sources. To reduce power consumption, SRW devices are typically not connected to a network until they need to exchange information with another entity (e.g., an application server or an SRW device that is not locally connected) of the network. And to conserve energy in establishing a network connection, SRW devices are configured to transmit and receive signals having a limited geographical reach. For example, a BLE device typically has a transmission radius of 30 meters. Accordingly, SRW devices do not typically include any long-range wireless capabilities. To establish a remote connection (e.g., an Internet connection), an SRW device needs a routing device that can transmit and receive signals conforming to one or more long-range wireless communication protocols, which include but are not limited to WiFi IEEE 802.11, 3GPP and 4G LTE.

According to several implementations of the present disclosure, a long-range wireless (LRW) device can be adapted as a router for establishing a remote connection between an SRW device and a network entity (e.g., an application server or another SRW that is not locally connected) that is remotely located and beyond the transmission range of the SRW device. Consistent with the disclosure of these implementations, an LRW device can be a physical device that is capable of communicating with the SRW device as well as transmitting and receiving signals conforming to one or more long-range wireless communication protocols as disclosed above. In one implementation, for example, the LRW device may be a mobile device, such as a smart phone, a computer tablet, or a portable computer, that is equipped with both short-range and long-range transmission capabilities. The LRW device can be pre-subscribed to service one or more SRW devices. The subscribed LRW device recognizes the SRW devices or the service to be performed by registering a set of globally unique subscription identifiers. Upon detecting the proper subscription identifier, the LRW device will automatically establish a short-range wireless connection with one or more SRW devices. The LRW device establishes this short-range wireless connection in an autonomous manner such that it does not require any supervision or intervention from a human operator.

From a functional point of view, several implementations of the present disclosure provide seamless long-range network service for one or more SRW devices by using an LRW device as a router. By adopting the systems and methods as described herein, an SRW device can conserve energy while being able to initiate and sustain a long-range connection whenever there is a need for exchanging data with a network entity. Moreover, an LRW device can automatically detect such a need and provide the requested connection without inconveniencing a human user. In other words, the LRW device can service one or more SRW devices autonomously and in a manner that is independent of any supervision or intervention from a human operator.

FIG. 1 shows an example of a remote communication system 100 according to one aspect of the present disclosure. The remote communication system 100 includes a local communication system 102 connected with a server 160 via a remote communication channel 136. The local communication system 102 is serviced by at least one long-range wireless (LRW) device 140 acting as a router for one or more short-range communication systems, such as short range communication system 103. The LRW device 140 includes a long-range transceiver (LRTX) 144 for establishing the remote communication channel 136 with the server 160. Depending on the nature of the remote communication channel 136, the LRTX 144 can be configured and/or equipped with one or more circuitries, each of which is responsible for transmitting and receiving a distinctive type of communication signals.

In one implementation, for example, the LRTX 144 can be configured and/or equipped with a circuitry for transmitting and receiving communication signals that conform to one or more WiFi standards. In another implementation, for example, the LRTX 144 can be configured and equipped with a circuitry for transmitting and receiving communication signals that conform to one or more 3GPP standards. In yet another implementation, for example, the LRTX 144 can be configured and/or equipped with a circuitry for transmitting and receiving communication signals that conform to one or more 4G LTE standards.

The LRW device 140 also includes a short-range transceiver (SRTX) 142 for communicating with the short-range communication system 103, which includes at least one short-range wireless (SRW) device, such as SRW device 110. The SRW device 110 is a physical device capable of performing one or more specific functions and processing information related to these specific functions. These specific functions typically relates to the sensing and/or logging of one or more physical states (e.g., temperature, light, flow of utilities, and etc.), which are generally unrelated to the transmission and reception of the short-range wireless signals.

According to one implementation of the present disclosure, for example, the SRW device 110 can be a temperature logger that is designated to sense the temperature of a truck's storage area. Such a temperature logger is capable of sensing the internal temperature at specific time intervals and reporting the sensed temperature to a company that operates the truck. The SRW device 110, performing the specific function of temperature logging, can request a connection service from the LRW device 140 once the SRW device 110 is ready to report. The human operator of the LRW device 140 can be a truck driver who works for the truck company, who may or may not be aware of the location and/or operation of the SRW device 110. If the requested LRW device 140 has been subscribed to perform such a connection service for the SRW device 110, the LRW device 140 will automatically establish a short-range wireless connection with the requesting SRW device 110 and relay the temperature report generated by the SRW device 110 to an application server (e.g., the server 160) that services the truck company. Advantageously, the LRW device 140 can deliver its service autonomously and without requiring any input, supervision, or intervention from a human operator.

According to another implementation of the present disclosure, for example, the SRW device 110 can be a water meter that is designated to measure the water consumption of a residential household. Such a water meter is capable of recording the incremental water consumption each day and reporting the daily water consumption to a water company that services the household. The SRW device 110, performing the specific function of water metering, can request a connection service from the LRW device 140 once a day. The human operator of the LRW device 140 can be the resident of the household, or alternatively, a service person who visits the household on a regular basis. In any event, the human operator of the LRW device 140 does not need to know the location and/or operation of the SRW device 110 for the LRW device 140 to perform the connection service. If the requested LRW device 140 has been subscribed to perform such a connection service for the SRW device 110, the LRW device 140 will automatically establish a short-range wireless connection with the requesting SRW device 110 and relay the daily water consumption metered by the SRW device 110 to an application server (e.g., the server 160) that services the water company. Advantageously, the LRW device 140 can deliver its service autonomously and without requiring any input, supervision, or intervention from a human operator.

In addition to the SRW device 110, the short-range communication system 103 includes a short-range wireless nudging (SRWN) device 120. The SRWN device 120 is associated with a group of peer SRW devices, such as the SRW device 110, and the SRWN device 120 receives connection requests from the peer SRW devices. Upon receiving a connection request, the SRWN device 120 is responsible inciting, or nudging, the LRW device 140 to render the requested connection. Moreover, the SRWN device 120 may also responsible for prioritizing the connection services requested by the peer SRW devices. In one implementation, the SRWN device 120 is configured to transmit an incitation signal to declare a subscription zone during a notification period. If the LRW device 140 is located within the subscription zone and subscribed to perform a network service, the LRW device 140 will recognize the incitation signal. Accordingly, the LRW device 140 will automatically search for SRW devices (e.g., the SRW device 110) that announce their presence before connecting them. In particular, the LRW device 140 can send out a scan request signal, which solicits a scan respond signal from the SRW devices.

Upon receiving a valid scan respond signal from an SRW device, the LRW device 140 will establish a local communication channel 134 with the responding SRW device. The LRW device 140 can render one or more subscribed services to the connected SRW device via the local communication channel 134. In one implementation, for example, the LRW device 140 can be configured to obtain authentication data from the SRW device 110. The LRW device 140 may act as a proxy authenticator to verify the authenticity of the SRW device 110. In the alternative, the LRW device 140 can forward the authentication data to the server 160 and request the server to perform the authentication. If the authenticity of the SRW device 110 is verified, the LRW device 140 can establish a data path between the SRW device 110 and the server 160.

The established data path can be a physical data path through which data are exchanged between the SRW device 110 and the server 160 in real time. Alternatively, this data path can be a logical data path comprising multiple segments between the SRW device 110 and the server 160. From a structural standpoint, the established data path includes the local communication channel 134 and the remote communication channel 136. If the data path operates in real time, then the local communication channel 134 and the remote communication channel 136 are turned on simultaneously. However, if the data path is a logical one, then the local communication channel 134 and the remote communication channel 136 may be turned on at different times. In that case, the LRW device 140 acts as a hub for storing and forwarding data to be exchanged between the SRW device 110 and the server 160. In any event, the LRW device 140 relays data from the SRW device 110 to the server 160 and vice versa via the established data path.

To enhance the security of the established data path, the connected SRW device 110 and the server 160 can perform end-to-end encryption by applying a secret key that is known only to the particular SRW device 110 and the server 160. That way, the LRW device 140 will have no access to the content of the encrypted data being transmitted along the secured data path.

From a functional standpoint, the transmission of an incitation signal initiates the establishment of the local communication channel 134, as well as the data path. Such an initiation process is done without any human supervision or intervention. By generating and transmitting the incitation signal, the SRWN device 120 incites the LRW device 140 to perform a series of background operations that do not require notifying a human user. These background operations facilitate the seamless network service provided to one or more SRW devices, such as the SRW device 110.

To conserve energy, the LRW device 140 may follow a service policy to perform the background operations for only a predetermined amount of time (as a specific example, an Apple iPhone terminates the background operation for communicating with a BLE enabled device within 3 minutes). In other words, the LRW device 140 may expire the subscription zone declared by the incitation signal after this predetermined amount of time has lapsed.

Anticipating that the LRW device 140 will expire the subscription zone to conserve energy, the SRWN device 120 renounce the subscription zone during a reset period to allow the LRW device 140 to exit and reenter the subscription zone later. To renounce the subscription zone, the SRWN device 120 conceals the incitation signal during the reset period. The general purpose of concealing the incitation signal is to prevent the incitation signal from being detected by the LRW device 140. There are several ways in which the SRWN device may conceal the incitation signal. In one implementation, for example, the SRWN device 120 can conceal the incitation signal 132 by stopping, halting, or suspending the transmission of the incitation signal 132. In another implementation, for example, the SRWN device 120 can conceal the incitation signal 132 by reducing its transmission amplitude so that the LRW device 140 will be unable to detect it. In yet another implementation, the SRWN device 120 can conceal the incitation signal 132 by using a different transmission frequency so that the LRW device 140 will be unable to detect it. In yet another implementation, for example, the SRWN device 120 can conceal the incitation signal 132 by deactivating or turning off the short-range transceiver 128 during the reset period.

The purpose of renouncing the subscription zone is to stage a logical exit of the subscription zone for the LRW device 140. According to an aspect of the present disclosure, the LRW device 140 may or may not restart the background operations for connecting the SRW device 110 once the LRW device 140 has expired the subscription zone. This is particularly the case when the LRW device 140 remains within the subscription zone. As such, the LRW device 140 will not resume the connection service for the SRW device 110 if the LRW device 140 continues to detect the incitation signal 132. Nevertheless, the LRW device 140 will reset the background operations according to a reentry policy, which allows the LRW device 140 to reenter a subscription zone after a predetermined amount of time lapse since its last exit (as an example, an Apple iPhone allows reentry after up to 20 minutes of leaving a subscription zone). By concealing the incitation signal 132, the SRWN device 120 prevents the LRW from detecting the incitation signal 132. As a result, the SRWN device 120 leads the LRW device 140 to logically exit the subscription zone even though the LRW device remains within the physical boundary of the subscription zone. That way, the LRW device 140 can reset and reenter the subscription zone, and it will be ready to resume the connection service for the SRW device 110 upon detecting another incitation signal 132.

The SRWN device 120 is configured to alternate the notification period and the reset period, such that the declaring and renouncing of the subscription zone take place periodically and alternately. By alternating the declaration and renunciation of the subscription zone, the SRWN device 120 allows the LRW device 140 to logically enter, exit and reenter the subscription zone without having the LRW device 140 physically exit the subscription zone. In this manner, the SRWN device 120 ensures that the connection service requested by the peer SRW devices (e.g., the SRW device 110) will not be prematurely terminated by the LRW device 140. The notification period and the reset period can be calibrated by the SRWN device 120, the peer SRW device 110, the LRW device 140, and/or the server 160. Alternatively, the notification period and the reset period can be calibrated by the manufacturer of the SRWN device 120 during a pre-configuration process. After calibration, the notification period can be used for tracking the service policy of the LRW device 140 whereas the reset period can be used for tracking the reentry policy of the LRW device 140.

The notification period can be calibrated to track the service policy in several ways. In one implementation, for example, the notification period can be calibrated to track the service policy by approximating a period of time corresponding to the amount of time the LRW device 140 has allocated to perform the network service before expiring the subscription zone. In another implementation, for example, the notification period can be calibrated to track the service policy by being updated according to a previous connection with the LRW device 140. As a more specific example, the SRWN device 120 can update the notification period to a time period corresponding to a minimum connection time or an average connection time of a series of previous connections. In another implementation, for example, the notification period can be calibrated to track the service policy by being updated according to a feedback provided by the LRW device 140. In yet another implementation, for example, the notification period can be calibrated to track the service policy by receiving regulation data from the server 160, which is designated to synchronize the operations between the SRW devices (e.g., the SRW device 110) and the LRW device 140.

Similarly, the reset period can be calibrated to track the reentry policy in several ways. In one implementation, for example, the reset period can be calibrated to track the reentry policy by approximating a period of time corresponding to the amount of time the LRW device 140 typically takes to exit and reenter the subscription zone. In another implementation, for example, the reset period can be calibrated to track the reentry policy by being updated according to a previous connection with the LRW device 140. As a more specific example, the SRWN device 120 can update the notification period to a time period corresponding to the maximum or average time the LRW device 140 took to exit and reenter the subscription zone after each of the previous connections. In another implementation, for example, the reset period can be calibrated to track the reentry policy by being updated according to a feedback provided by the LRW device 140. In yet another implementation, for example, the reset period can be calibrated to track the reentry policy by receiving regulation data from the server 160, which is designated to synchronize the operations between the SRW devices (e.g., the SRW device 110) and the LRW device 140.

According to an aspect of the present disclosure, the LRW device 140 is equipped with hardware and software for detecting, processing, and responding to the incitation signal 132. In one implementation, the LRW device 140 is equipped with a processor circuitry 146, a memory 147, and a human user interface (HUI) 156. The processor circuitry 146 can be a general purpose processor chip that is configured to implement a set of programming instructions for detecting, processing, and responding to one or more incitation signals 132. Alternatively, the processor circuitry 146 can be an application specific integrated circuit (ASIC) that is embedded with a set of programming instructions for detecting, processing, and responding to one or more incitation signals 134.

The memory 147 can be any memory device capable of being installed and incorporated within the physical and logical framework of the LRW device 140. The memory 147 is coupled with the processor circuitry 146, and the memory 147 provides several input elements to the processor circuitry 146 as well as storing the output elements of the processor circuitry 146. In one implementation, the memory 147 can store an application bank 150, which includes one or more program applications. These program applications can be preinstalled by the manufacturer of the LRW device 140. Alternatively, the user of the LRW device 140 may direct the LRW device 140 to download a program application from the server 160 via the remote communication channel 136.

Each program application may include a foreground thread 154 and one or more background threads 152. As disclosed herein, a foreground thread 154 is a portion of a program application for interacting with a human user. For instance, the foreground thread 154A is a portion of the program application 150A, and it can be compiled and/or executed by the processor circuitry 146 for generating one or more signals for operating the human HUI 156. Through the foreground thread 154, the processor circuitry 146 can request a human user to provide an input via the HUI 156, which may include a visual display and/or a speaker for conveying such a request. And through the foreground thread 154, the processor circuitry 146 can receive inputs from a human user via the HUI 156, which may include a touch screen, a keyboard, and/or other motion sensors. Moreover, through the foreground thread 154, the processor circuitry 146 can notify a human user with information related to the operations of the program application 150 and/or any output generated by the program application 150.

As disclosed herein, a background thread 152 is a portion of a program application that operates without requiring any intervention or input from a human user. For instance, a background thread 152A is a portion of the program application 150A, and it can be compiled and/or executed by the processor circuitry 146 for generating one or more signals for controlling the operations of the short-range transceiver (SRTX) 142, the long-range transceiver (LRTX) 144, and the memory 148.

In general, the processor circuitry 146 can deactivate or turn off a program application (e.g., the program application 150A) if a human user has decided to suspend that program application or has not interacted with that program application for a certain amount of time. Upon detecting an incitation signal, the processor circuitry 146 can reactivate one or more background threads 152 of the program application 150 while keeping the foreground thread 154 deactivated. This deactivation-reactivation dichotomy allows the LRW device 140 to conserve energy but without compromising the performance of high priority operations. Specifically, the processor circuitry 146 can determine whether or not the incitation signal 132 is associated with any one of the program applications 150. For example, if the incitation signal 132 is associated with a program application 150B, then the processor circuitry 146 is configured to activate a background thread 152B while keeping a foreground thread 154B and the remaining program applications (i.e., 150A and 150C-150G) deactivated. As another example, if the incitation signal 132 is associated with program applications 150C and 150D, then the processor circuitry 146 is configured to activate background threads 152C and 150D while keeping foreground threads 154C and 154D, as well as the remaining program applications (i.e., 150A-150B and 150E-150G), deactivated. According to an aspect of the present disclosure, the processor circuitry 146 is configured to autonomously activate the background threads 152, such that a human user is not required to supervise, interfere or provide any form of input. Thus, the activation of the background threads 152 is seamless and transparent to the human user, thereby freeing the human user from responding to the incitation signal and managing the activation process. In an alternative implementation, the processor circuitry 146 can reactivate the background threads 152 along with the foreground thread 154 upon detecting an incitation signal 152. Like the activation of the background thread 152, the activation of the foreground thread 154 is performed autonomously and without the intervention or supervision of a human user. Moreover, the activation of the foreground thread 154 provides the human user an opportunity to receive information related to the transmitted incitation signal 152 and/or control one or more aspects of the rendering of the corresponding subscription service.

Through the background threads 152, the processor circuitry 146 can detect and decode the incitation signal 132 transmitted by the SRWN device 120. And through the background thread 152, the processor circuitry 146 can determine whether or not the LRW device 140 is subscribed to provide a connection service to one or more SRW devices (e.g., the SRW device 110) based on the decoded incitation signal 132. Moreover, through the background thread 152, the processor circuitry 146 can direct the SRTX 142 to establish the local communication channel 134 with the associated SRW devices (e.g., the SRW device 110). Furthermore, through the background thread 152, the processor circuitry 146 can direct the SRTX 142, and along with the LRTX 144, to provide the network service for the associated SRW devices (e.g., the SRW device 110). In one implementation, the network service includes establishing a data path by joining, either physically or logically, the local communication channel 134 and the remote communication channel 136. According to an aspect of the present disclosure, the processor circuitry 146 is configured to autonomously run the background thread 152, such that a human user is not required to supervise, interfere or provide any form of input. Thus, the operations of the background thread 152 are seamless and transparent to the human user, thereby freeing the human user from managing the connection services and/or network services provided for the SRW devices.

The LRW device 140 can be subscribed, by a human user or by way of pre-configuration, to provide connection services and/or network services for one or more SRW devices. According to an aspect of the present disclosure, a human user (i.e., an owner or an authorized operator) of the LRW device 140 can initiate the subscription process by installing a program application (e.g., the program application 150A) that can recognize a set of subscription identifiers. After the installation, the processor circuitry 146 is configured to compile and/or execute the foreground thread 154 of the application 150, which will in turn present the user with one or more service agreements.

Each service agreement may cover a range of SRW devices or services related to the short-range and/or long-range capabilities of the LRW device. In one implementation, each agreement can cover a class of SRW devices to which the user agrees to provide connection services and/or network services. For example, the installed application 150A can present an agreement that covers temperature logging devices that are owned and operated by a particular company (e.g., a food transportation company). In another implementation, each agreement can cover a class of service to which the user agrees to provide regardless of the service recipients' device classifications. For example, the installed application 150B can present an agreement that specifically covers Bluetooth connection services for all preapproved SRW devices for a predetermined service period (e.g., 5 minutes). In yet another implementation, each agreement can encompass a specific class of SRW devices for receiving a specific class of service. In yet another implementation, each agreement can encompass a specific type of short-range wireless service and/or a specific type of long-range wireless service from the LRW device.

The user may select and accept any one of these service agreements by using the HUI 156, which will provide the user's input to the foreground thread (e.g., the foreground thread 154A) of the responsible program application (e.g., the program application 150A). According to an aspect of the present disclosure, the user accepting the service agreement does not have to own, or be authorized to operate, the SRW devices to which the LRW device 140 is subscribed to provide connection services. Advantageously, the systems encompassed by the present disclosure can leverage the mobility and connectivity of a large number of LRW devices, which can be owned or operated by different users, in establishing a coherent network (e.g., a machine-to-machine (M2M) network or an Internet-of-things (IOT) network).

Once the user has accepted a service agreement, the LRW device 140 is subscribed to the service as presented in that service agreement. As a result, the LRW device 140 will receive a set of subscription identifiers that are associated with the subscribed service as set forth in the service agreement. Depending on the specific arrangement, each subscription identifier can be associated with a SRW device (e.g., the SRW device 110, a SRWN device (e.g., the SRWN device 120), a particular service to be rendered for a group of SRW devices, and/or a particular service to be rendered to a group of peer SRW devices that are peers of an SRWN device. Each subscription identifier is globally unique even though the LRW device 140 may attribute multiple subscription identifiers to a single program application (e.g., the program application 150A) that recognizes the same class of service and/or same group of SRW devices. Each subscription identifier may include multiple segments, each representing a piece of information related to either the originating program application 150, the class of service, the identity of an SRW device, or a level of service priority. As an example, a universal unique identifier (UUID) as embedded in an iBeacon signal can be adapted to generate a subscription identifier. As another example, a near-field communication (NFC) signal format can be adapted to include a unique subscription identifier.

The LRW device 140 may receive the set of subscription identifiers from multiple sources. In one implementation, the LRW device 140 can download the set of subscription identifiers from the server 160. In another implementation, the LRW device 140 can receive the set of subscription identifiers via the installed application. In another implementation, the LRW device 140 can obtain the set of subscription identifiers by scanning a label (e.g., a bar code, an RFID tag, an NFC tag, or a magnetic strip) attached to an SRW device. In yet another implementation, the LRW device 140 can accept the set of subscription identifiers from a human user via the HUI 156. Once the LRW device 140 receives the set of subscription identifiers, the corresponding program application 150 will direct the processor circuitry 146 to store the subscription identifiers in a subscription registry 148. Depending on the system architecture of the LRW device 140, the subscription registry 148 can be created within the memory 147, or alternatively, it can be created in a memory structure independent of the memory 147.

The subscription identifiers can be issued by one or more entities. In one implementation, for example, the subscription identifiers can be issued by the manufacturer of the SRW devices that request the connection service. In another implementation, for example, the subscription identifiers can be issued by an authentication server (e.g., the server 160) that brokers the service agreements. In yet another implementation, for example, the subscription identifiers can be issued by an application server (e.g., the server 160) that monitors and/or manages the performance of the subscribed services. Depending on the nature of the subscribed service and the issuing entity, the set of subscription identifiers can be expanded, reduced, and otherwise updated over time based on one or more conditions. These conditions include but are not limited to: the SRW devices that have been added or deleted from the service agreement, the classes of services that have been added or deleted from the service agreement, and the ongoing relationship between the user and the company that publishes and maintains the program application 150.

Once the set of subscription identifiers are received and stored, the processor circuitry 46 of the LRW device 140 can turn off or deactivate the program application (e.g., the program application 150A) that helps originate the subscription process. When the program application 150 is deactivated, the LRW device 140 does not provide any connection service to the SRW devices based on the deactivated program application 150. During the deactivation of the program application 150, the LRW device 140 is configured to detect one or more incitation signals, such as the incitation signal 132, by using the short-range transceiver (SRTX) 142.

Each incitation signal carries an identifier, which can be detected by the processor circuitry 146 of the LRW device 140. For example, an iBeacon signal bearing a UUID can be detected as an incitation signal by the processor circuitry 146 of the LRW device 140. In the event that the detected identifier is matched with a subscription identifier stored in the subscription registry 148, the processor circuitry 146 will determine that the LRW device 140 is subscribed to a service that is associated with the matched subscription identifier. Accordingly, the processor circuitry 146 automatically activates the background thread 152 of the corresponding program application 150. For instance, if subscription identifier $S_N$ is received and stored in association with program application 150D, then the processor circuitry 146 will activate background thread 152D upon matching an incoming identifier with subscription identifier $S_N$ in the subscription registry 148. According to an aspect of the present disclosure, this activation process is performed autonomously by the LRW device 140 so as to eliminate the need of any human input or human intervention. To that end, the LRW device 140 may invoke one or more functions of the background thread 152 without notifying or inconveniencing a human user.

Once being activated, the background thread 152 will cause the processor circuitry 146 to perform a series of functions for providing the subscribed services in association with the matching subscription identifier. To that effect, the processor circuitry 146 autonomously directs the SRTX 142 to search for and establish a connection with a SRW device (e.g., the SRW device 110) that is associated with the matching subscription identifier. In one implementation, the background thread 152 can cause the processor circuitry 146 to generate, and direct the SRTX 142 to transmit, a scan request signal to surrounding SRW devices.

In response to the scan request signal, an SRW device (e.g., the SRW device 110) can generate and transmit a scan response signal if one or more conditions are met. For instance, an SRW device can generate and transmit a scan response signal if it incurs sufficient data for communicating with the application server (e.g., the server 160 or a remote SRW device). The purpose of the scan response signal is to notify the LRW device 140 of the presence of the SRW device and the connection needs of the SRW. Thus, an SRW device may refrain from generating any scan response signal if it does not need to be connected. In that case, the LRW device 140 will not establish any connection with the SRW device.

The processor circuitry 146 can verify the validity of a scan respond signal in several ways. In general, the processor circuitry 146 determines whether the scan respond signal comport with an addressing scheme of the SRW device. In one implementation, the processor circuitry 146 can determine the validity of the scan respond signal based on a predetermined data format. For instance, the process circuitry 146 can verify the address of the SRW device class and/or the transmission protocol between the SRW device and the server]. In another implementation, the processor circuitry 146 can verify the validity of a scan response signal with an application server (e.g., the server 160) via the remote communication channel 136. Upon detecting a valid scan respond signal, the background thread 152 can cause the processor circuitry 146 to establish a local communication channel 134 with the corresponding SRW devices (e.g., the SRW device 110) using the SRTX 134. Acting as an interface between the local communication channel 134 and the remote communication channel 136, the LRW device 140 completes a data path connecting the SRW device 110 to the server 160 (or a remote SRW device). As a result, the LRW device 140 can relay data from the SRW device 110 to the server 160 in an autonomous manner, which does not require any input or intervention from a human user.

The SRW device 110 includes a short-range communication module (SRC) module 112 for transmitting and receiving short-range communication signals that comport to short-range communication standards, which include but are not limited to Bluetooth, Bluetooth Low Energy, ZigBee, IEEE 802.15, 6LoWPAN, Sub-GHz Wireless Radio, NFC, and RFID. The SRC module 112 is a hardware component including a memory 114, a processor circuitry 116, and a short-range transceiver (SRTX) 118. The processor circuitry 116 can be a general purpose processor chip that is configured to implement a set of programming instructions for establishing a short-range wireless connection with the LRW device 140. In the alternative, the processor circuitry 116 can be an application specific integrated circuit (ASIC) that is embedded with a set of programming instructions for establishing a short-range wireless connection with the LRW device 140.

Moreover, the processor circuitry 116 can be configured to perform one or more specific functions of the SRW device 110. In particular, the processor circuitry 116 can receive and process data related to the performance of these specific functions. In one implementation, for example, the processor circuitry 116 can be integrated to a temperature logger. In another implementation, for example, the processor circuitry 116 can be integrated to a water meter.

The memory 114 can be a physical component independent of the processor circuitry 116, or a logical component of an integrated circuit encompassing the processor circuitry 116. In either case, the memory 114 is coupled with the processor circuitry 116, and the memory 114 is responsible for storing data that are related to the operations of the processor circuitry 116. In one implementation, the memory 114 can be used for storing input and/or output data related to the short-range wireless communication operations of the processor circuitry 116. In another implementation, the memory 114 can be used for storing input and/or output data related to the specific operations of the processor circuitry 116, such as temperature logging or water metering. In yet another implementation, the memory 114 can be used for storing programming instructions to be compiled and/or executed by the processor circuitry 116 for performing one or more operations.

Upon compiling and/or executing the relevant programming instructions, the processor circuitry 116 will drive the SRTX 118 to transmit one or more short-range communication signals. In general, these short-range communication signals are intended for the short-range wireless nudging (SRWN) device 120 or the long-range wireless (LRW) device 140. When the SRW device 110 needs to communicate with the server 160 or a remote SRW device (not shown), for example, the processor circuitry 116 will drive the SRTX 118 to transmit a short-range request signal to the SRWN device 120 requesting the generation and transmission of the incitation signal 132. If the SRWN device 120 is a peer of the requesting SRW device 110, the SRWN device 120 will grant the request by generating and transmitting the incitation signal 132. At that point, the LRW device 140 may receive the incitation signal 132 and recognize a subscribed service associated with a subscription identifier carried by the incitation signal 132. To honor the agreed upon subscription, the LRW device 140 initiates a verification process with the nearby SRW devices, such as the SRW device 110. To participate in this verification process, the processor circuitry 116 will drive the SRTX 118 to transmit one or more response signals to exchange verification codes and/or authentication information.

After the SRW device 110 and the LRW device 140 have established mutual trust, the processor circuitry 116 will drive the SRTX 118 to transmit short-range data signals for forwarding data to the server 160 or a remote SRW device. In one implementation, the data signals can be encrypted and decrypted by a secret key known only to the transmitting SRW device 110 and the server 160. Under such an implementation, the data path established by the local communication channel 134 and the remote communication channel 136 is secured. As a result, the content of the short-range data signals is protected from being discovered by the LRW device 140 and/or other intermediate nodes along the remote communication channel 134.

The SRWN device 120 includes a short-range communication module (SRC) module 122 similar to the SRC module 112 of the SRW device 110. In particular, the SRC module 112 is configured to transmit and receive short-range communication signals that comport to short-range communication standards, which include but are not limited to Bluetooth, Bluetooth Low Energy, ZigBee, IEEE 802.15, 6LoWPAN, Sub-GHz Wireless Radio, NFC, and RFID. Like the SRC module 112, the SRC module 122 is a hardware component including a memory 124, a processor circuitry 126, and a short-range transceiver (SRTX) 128. The processor circuitry 126 can be a general purpose processor chip that is configured to implement a set of programing instructions for generating one or more incitation signals 132. Alternatively, the processor circuitry 116 can be an application specific integrated circuit (ASIC) that is embedded with a set of programming instructions for generating one or more incitation signals 132.

The memory 124 can be a physical component independent of the processor circuitry 126, or a logical component of an integrated circuit encompassing the processor circuitry 126. In either case, the memory 124 is coupled with the processor circuitry 126, and the memory 124 is responsible for storing data that are related to the generation, transmission, and concealment of the incitation signal 132. According to an aspect of the present disclosure, the memory 124 can be used for storing a list of subscription identifiers that are associated with one or more connection services subscribed by the LRW device 140. As such, each of the stored subscription identifiers can be retrieved by the processor circuitry 126 for generating the incitation signals 132.

The list of subscription identifiers can be received from multiple sources. In one implementation, for example, the list of subscription identifiers can be pre-loaded onto the memory 124 by the manufacturer of the SRWN device 120. In another implementation, for example, the list of subscription identifiers can be received from a peer SRW device, such as the SRW device 110, after the SRWN device 120 has recognized the peer status of the SRW device. In yet another implementation, for example, the list of subscription identifiers can be received from the server 160 in the event that the LRW device 140 has established a secured data path between the SRWN device 120 and the server 160.

Moreover, the memory 124 can be used for storing programming instructions to be compiled and/or executed by the processor circuitry 126 so as to cause the processor circuitry 126 to generate and direct the transmission and concealment of the incitation signals 132. According to an aspect of the present disclosure, the processor circuitry 126 is configured to generate an incitation signal 132 based on one or more subscription identifiers. From a data structure standpoint, the payload of an incitation signal 132 can be modeled after an advertising signal as adopted in one or more short-range wireless communication standards, such as Bluetooth, Bluetooth Low Energy, ZigBee, IEEE 802.15, 6LoWPAN, Sub-GHz Wireless Radio, NFC, and RFID. As a specific implementation, for example, the incitation signal 132 can be modeled after an iBeacon signal if the LRW device 140 is an Apple iPhone and if the SRWN device 120 is a BLE enabled device. In another implementation, the incitation signal 132 can be modeled after another proprietary format if the LRW device is an Android-enabled smart phone.

According to another aspect of the present disclosure, moreover, the payload of the incitation signal 132 may include data fields for specifying one or more service parameters to the LRW device 140. In one implementation, for example, the incitation signal 132 may include a data field for specifying a priority of the requested service in case the LRW device 140 receives multiple incitation signals 132 from multiple SRWN devices. In another implementation, for example, the incitation signal 132 may include a data field for specifying a bandwidth requirement related to the requested service so that the LRW device 140 can determine the manner in which the service is performed. In yet another implementation, for example, the incitation signal 132 may include a data field for specifying a data size of the payload so that the LRW device 140 can allocate sufficient service cycles for rendering the connection service.

After generating the incitation signal 132, the processor circuitry 126 is configured to direct the SRTX 128 to transmit and conceal the incitation signal 132 at specific time periods to optimize the quality and duration of the services provided by the LRW devices 140. More specifically, the transmission of the incitation signal 132 alternates with the concealment of the incitation signal. This alternating transmission-concealment scheme is distinctive from the transmission scheme of a conventional advertising signal, the primary purpose of which is to declare the presence of a short-range wireless device, such as the SRW device 110.

Figure 2A:
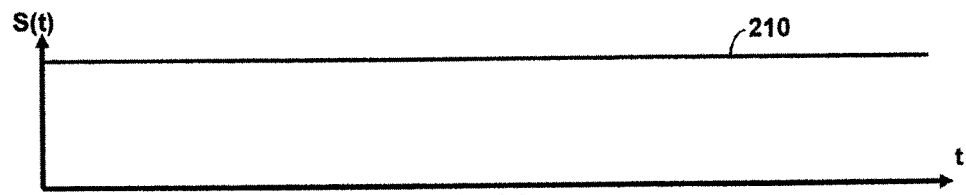
FIG. 2A shows an example of an advertising signal generated and transmitted by a short-range wireless device according to one aspect of the present disclosure.

As shown in FIG. 2A, for reference, an SRW device (e.g., the SRW device 110) can generate and transmit an advertising signal 210 when the SRW device wants to be detected and connected to another wireless device. The output S(t) of the SRW device emits the same advertising signal 210 as long as the SRW device remains activated. Unfortunately, the constant transmission of the advertising signal 210 can only alert an LRW device (e.g., the LRW device 140) once. In response to the advertising signal 210, the LRW device may alert a user of the presence of the SRW device, and it may display to the user a message associated with the advertising signal 210. If the user ignores or overlooks such an alert, the LRW device will take no further action. Moreover, once the LRW device has acted upon a detected advertising signal 210, the LRW device will ignore the further detection of a continuous advertising signal 210. As a result, the constant transmission of an advertising signal, such as the advertising signal 210, does not incite an LRW device to provide a stable connection service in the absence of a human user's supervision and/or intervention.

Figure 2B:
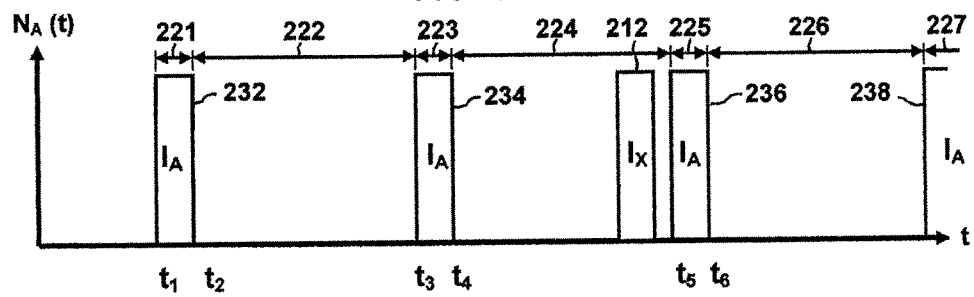
FIG. 2B shows an example of an incitation signal generated and transmitted by a short-range wireless device according to one aspect of the present disclosure.

Unlike the conventional advertising signal, the incitation signal is transmitted according to an alternating pattern. As shown in FIG. 2B, for example, the output $N_A(t)$ of an SRWN device (e.g., the SRWN device 120) emits the incitation signal $I_A$ periodically within or during successive notification periods. In one implementation, the SRWN device is configured to transmit the incitation signal 232 during a first notification period 221 (i.e., $t_1<t<t_2$), the incitation signal 234 during a second notification period 223 (i.e., $t_3<t<t_4$), the incitation signal 236 during a third notification period 225 (i.e., $t_5<t<t_6$), the incitation signal 238 during a fourth notification period 227, and so forth.

Figure 3A:
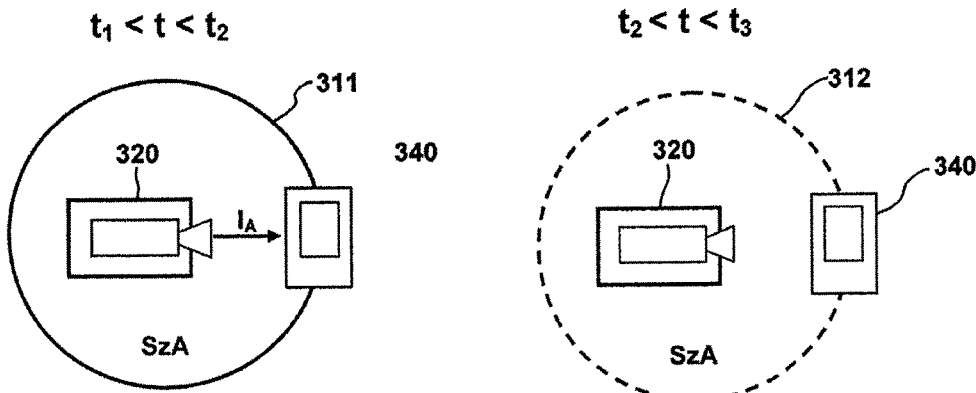
FIG. 3A shows an example of a subscription zone being declared and renounced by a short-range wireless device according to one aspect of the present disclosure.

During the transmission of the incitation signal $I_A$, the SRWN device declares a subscription zone. As shown in FIG. 3A, for example, the SRWN device 320 transmit the incitation signal $I_A$ during the first notification period ($t_1<t<t_2$), thereby declaring a subscription zone $S_ZA$. In general, a subscription zone, such as the subscription zone $S_ZA$, has a physical boundary and as a logical boundary. The physical boundary of a subscription zone can be defined by the transmission range, or transmission radius, of the incitation signal $I_A$. Accordingly, a LRW device 340 physically enters the subscription zone $S_ZA$ when it is within the transmission radius of the incitation signal $I_A$. The logical boundary of a subscription zone can be defined by the relative signal strength of the incitation signal $I_A$ at any moment of time. Depending on the particular implementation, the relative signal strength of the incitation signal $I_A$ can be determined by comparing the strength of the incitation signal $I_A$ with a threshold value or the strength of another incitation signal.

When the relative signal strength of the incitation signal $I_A$ is sufficiently high, an LRW device can detect the declaration of the subscription zone $S_ZA$ (i.e., the declared subscription zone 311). And if the LRW device is subscribed to provide a connection service in association with the subscription identifier embedded in the incitation signal $I_A$, then the LRW device is considered to have logically entered the subscription zone. As shown in FIG. 3A, for example, the LRW device 340 is within the physical boundary and logical boundary of the subscription zone $S_ZA$. Upon entering the logical boundary of the subscription zone $S_ZA$, the LRW device 340 will provide network connection service to the SRW devices that are located within the proximity of the subscription zone $S_ZA$ and according to the corresponding subscription agreement. In one implementation, an SRW device is within the proximity of a subscription zone if the SRW device is located within the physical boundary of the subscription zone. In another implementation, an SRW device is within the proximity of a subscription zone if the SRW device is connected to a peer-to-peer network having a node that is located within the physical boundary of the subscription zone.

When the relative signal strength of the incitation signal $I_A$ is low enough that an LRW device may no longer detect the presence of any subscription zone, the LRW device is considered to have logically exited or left the subscription zone. According to an aspect of the present disclosure, the SRWN device is configured to renounce the subscription zone (i.e., a renounced subscription zone 312) during each of the rest periods. To that end, the SRWN device conceals the incitation signal $I_A$ during the reset periods to reduce the relative signal strength of the incitation signal $I_A$. Referring again to FIG. 2B, for example, the SRWN device is configured to conceal the incitation signal 232 during a first reset period 222 (i.e., $t_2<t<t_3$), the incitation signal 234 during a second reset period 224 (i.e., $t_4<t<t_5$), the incitation signal 236 during a third reset period 226, and so forth.

As described above, there are several ways to conceal the incitation signal, which include but are not limited to halting the transmission of the incitation signal, reducing the transmission amplitude of the incitation signal, and/or adopting a different transmission frequency for the incitation signal so as to render it undetectable by the LRW device. As a result of the concealment process, the LRW device will be led to determine that it has exited or left the subscription zone. Such a determination does not require the LRW device to move outside of the physical boundary of the subscription zone however. Referring again to FIG. 3A, for example, the LRW device 340 logically exits the subscription zone $S_ZA$ during the reset period (i.e., $t_2<t<t_3$) even though the LRW device 340 remain within the physical boundary of the subscription zone $S_ZA$. By logically exiting or leaving the subscription zone $S_ZA$, the LRW device 340 can reset the associated subscription identifier and allow the reentry to the same subscription zone later. Accordingly, the alternating pattern of the transmission and concealment of the incitation signal $I_A$ allows the SRW device to receive continuous, stable connection service without requiring any supervision or intervention from a human user.

Figure 2C:
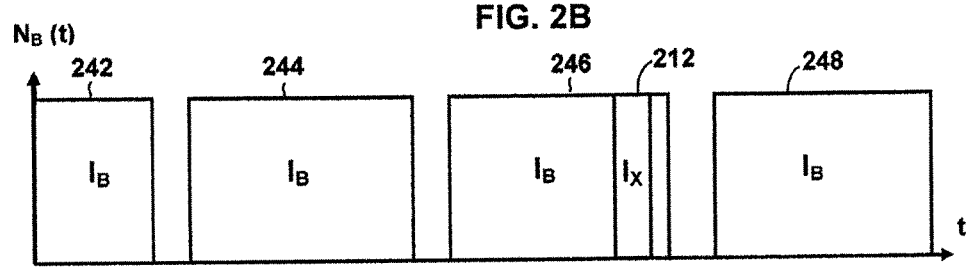
FIG. 2C shows an example of an auxiliary incitation signal generated and transmitted by a short-range wireless device according to one aspect of the present disclosure.

To optimize the connection service provided by the LRW device, the short-range communication system 103 as shown in FIG. 1 may include an auxiliary SRWN device (not shown). The physical structure of the auxiliary SRWN device is substantially the same as the SRWN device 120. Thus, the auxiliary SRWN device can be a standalone device or an integral part of the SRWN device 120. As shown in FIG. 2C, the functions of the SRWN device includes generating an auxiliary incitation signal $I_B$, transmitting the auxiliary incitation signal $I_B$ within or during each of the reset periods, and concealing the auxiliary incitation signal $I_B$ within or during each of the notification periods.

In general the processes for generating, transmitting, and concealing the auxiliary incitation signal $I_B$ are substantially the same as with the incitation signal $I_A$. For instance, the auxiliary incitation signal can be generated by incorporating an auxiliary subscription identifier that is associated with or recognized under a subscription service. Although the auxiliary subscription identifier may share a similar data structure with the subscription identifier, the auxiliary subscription identifier is globally unique and thus distinctive from the subscription identifier. Like the incitation signal $I_A$, the auxiliary incitation signal $I_B$ can be generated by modeling from a conventional advertising signal (e.g., an iBeacon signal). Moreover, the auxiliary incitation signal may include additional data fields for specifying one or more service parameters to the LRW device. These service parameters typically follow those as included in the incitation signal, such as incitation signal $I_A$.

Like the incitation signal $I_A$, the auxiliary incitation signal $I_B$ is transmitted according to an alternating yet inverse pattern. Referring again to FIG. 2C, for example, the output $N_B(t)$ of an auxiliary SRWN device (e.g., the SRWN device 120 or the SRW device 320) emits the auxiliary incitation signal $I_B$ periodically within or during successive reset periods. In one implementation, the auxiliary SRWN device is configured to transmit the auxiliary incitation signal 242 during a pre-notification reset period (i.e., $t<t_1$), the auxiliary incitation signal 244 during a first reset period 222 (i.e., $t_2<t<t_3$), the auxiliary incitation signal 246 during a second reset period 224, the auxiliary incitation signal 248 during a third reset period 226, and so forth.

Figure 3B:
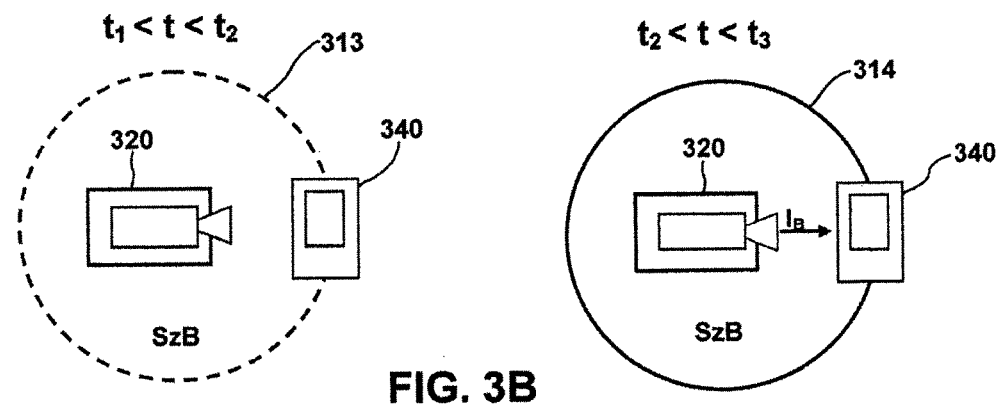
FIG. 3B shows an example of an auxiliary subscription zone being declared and renounced by a short-range wireless device according to one aspect of the present disclosure.

During the transmission of the incitation signal $I_B$, the auxiliary SRWN device declares a subscription zone. As shown in FIG. 3B, for example, the auxiliary SRWN device 320 transmit the auxiliary incitation signal $I_B$ during the first reset period ($t_2<t<t_3$), thereby declaring an auxiliary subscription zone $S_ZB$ (i.e., the declared auxiliary subscription zone 314). If the LRW device 340 is subscribed to provide a connection service in association with or recognized under the subscription identifier, it is likely that the subscribed service is also associated with or recognized under the auxiliary subscription identifier. As such, the LRW device 340 is considered to have logically entered the auxiliary subscription zone during the reset period.

Upon entering the logical boundary of the auxiliary subscription zone $S_ZB$, the LRW device 340 will provide connection services to the SRW devices that are located within the proximity of the subscription zone $S_ZB$ and according to the corresponding subscription agreement. In one implementation, a SRW device is within the proximity of an auxiliary subscription zone if the SRW device is located within the physical boundary of the auxiliary subscription zone. In another implementation, a SRW device is within the proximity of an auxiliary subscription zone if the SRW device is connected to a peer-to-peer network having a node that is located within the physical boundary of the auxiliary subscription zone.

The purpose of declaring an auxiliary subscription zone (e.g., $S_ZB$) is to supplement the subscription zone (e.g., $S_ZA$). Because an SRWN device (e.g., 320) cannot anticipate when an LRW device (e.g., 340) will enter into the physical boundary of the subscription zone, the SRWN device cannot guarantee that the LRW device may receive an incitation signal (e.g., $I_A$) while the LRW device is within the physical boundary of the subscription zone. For instance, an LRW device will not receive any incitation signal if it enters and leaves the physical boundary of the subscription zone in between successive notification periods (i.e., during a reset period). As a result, the LRW device will not provide any connection service to the SRW device even when the LRW device is subscribed to do so. To avoid this situation, the declaration of the auxiliary subscription zone provides a backup mechanism for inciting an LRW device that enters the physical boundary of the subscription zone during any reset period.

When the relative signal strength of the auxiliary incitation signal $I_B$ is low enough that an LRW device 340 may no longer detect the presence of any auxiliary subscription zone $S_ZB$, the LRW device 340 is considered to have logically exited or left the auxiliary subscription zone $S_ZB$. In one implementation, the auxiliary SRWN device is configured to renounce the auxiliary subscription zone $S_ZB$ (i.e., the renounced subscription zone 313) during each of the notification periods. To that end, the auxiliary SRWN device conceals the auxiliary incitation signal $I_B$ during the notification periods to reduce the relative signal strength of the auxiliary incitation signal $I_B$. Referring again to FIG. 2C, for example, the auxiliary SRWN device is configured to conceal the auxiliary incitation signal 242 during the first notification period 221, the auxiliary incitation signal 244 during the second notification period 223, the auxiliary incitation signal 246 during third notification period 225, and so forth.

According to an aspect of the present disclosure, the LRW device responds to the auxiliary subscription signal $I_B$ in substantially the same way as to the subscription signal $I_A$ provided that the auxiliary subscription zone $S_ZB$ spatially overlaps with the subscription zone $S_ZA$. The definition of spatial overlap may vary depending on the specific implementation. In one implementation, for example, the auxiliary subscription zone $S_ZB$ spatially overlaps with the subscription zone $S_ZA$ if 80% of their respective physical boundaries overlap with each other. In another implementation, for example, the auxiliary subscription zone $S_ZB$ spatially overlaps with the subscription zone $S_ZA$ if the SRWN device and the auxiliary SRWN device are separated by no more than 50% of their respective transmission radius. In yet another implementation, for example, the auxiliary subscription zone $S_ZB$ spatially overlaps with the subscription zone $S_ZA$ if the auxiliary SRWN device and the SRWN device are incorporated into a single device.

Figure 2D:
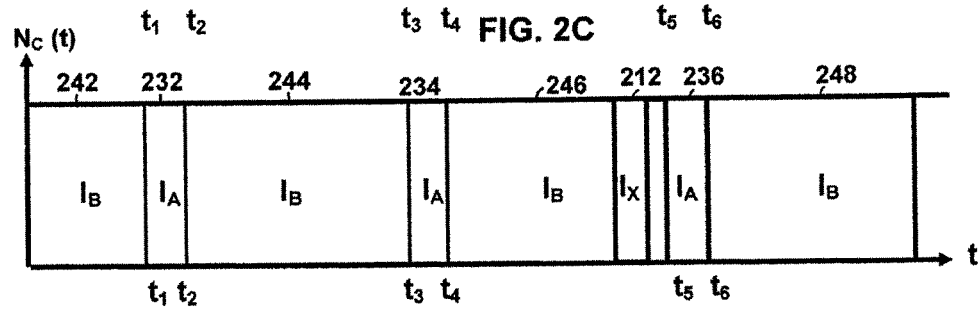
FIG. 2D shows an example of a pair of alternating incitation signal and auxiliary incitation signal generated and transmitted by a short-range wireless device according to one aspect of the present disclosure.
Figure 3C:
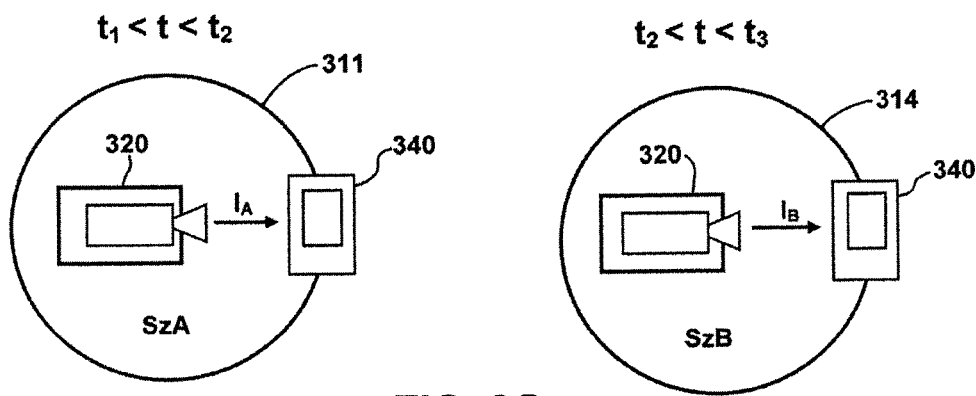
FIG. 3C shows an example of a subscription zone and an auxiliary subscription zone being alternated by a short-range wireless device according to one aspect of the present disclosure.

FIG. 2D, for example, shows that a single SRWN device can generate and transmit a pair of alternating incitation signal $I_A$ and auxiliary incitation signal $I_B$. During or within each of the notification periods, the output $N_C(t)$ of the SRWN device is configured to transmit the incitation signal $I_A$ and conceal the auxiliary incitation signal $I_B$. And during or within each of the reset periods, the output $N_C(t)$ of the SRWN device is configured to transmit the auxiliary incitation signal $I_B$ and conceal the incitation signal $I_A$ Consequently, as shown in FIG. 3C, the SRW device 320 alternates the declaration of the subscription zone $S_ZA$ (i.e., the declared subscription zone 311) with the declaration of the auxiliary subscription zone $S_ZB$ (i.e., the declared auxiliary subscription zone 314). And in a similar manner, the SRW device 320 alternates the renunciation of the subscription zone $S_ZA$ (i.e., the renounced subscription zone 312) with the renunciation of the auxiliary subscription zone $S_ZB$ (i.e., the renounced auxiliary subscription zone 313).

As disclosed above, the reset period can be used for tracking the reentry policy of an LRW device (e.g., the LRW device 140 or the LRW device 340). This tracking process may or may not be precise enough to optimize the connection service if the SRWN device (e.g., the SRWN device 120 or the SRWN device 320) does not have sufficient data to approximate or predict the LRW device's reentry policy. This could be the case if the SRWN device has not previously received any information or update regarding the reentry policy of the LRW device.

If the reset period is set too short, the LRW device will not have sufficient time to recognize the renunciation of the subscription zone (e.g., the subscription zone $S_ZA$) before receiving a subsequent incitation signal (e.g., incitation signal $I_A$). As a result, the LRW device does not logically exit and will not be able to logically reenter the subscription zone. Because the LRW device offer one service cycle to perform the connection service each time the LRW device enter a subscription zone, the LRW device will offer only one service cycle to perform the connection service if it does not logically exit the subscription zone. In a system where the LRW device is an Apple iPhone, each service cycle may include up to 3 minutes of a service period (i.e., a period of time that the LRW device is driven by the corresponding background thread to perform the connection service) and up to 20 minutes of a timeout period (i.e., a period of time that the corresponding background thread is deactivated to conserve energy). For certain data upload services requested by the SRW device, one service cycle may be insufficient to complete the task.

On the other hand, if the reset period is set too long, the SRW device will become disconnected from the LRW device long after the LRW device has logically exited the subscription zone. As a result, the connection service is not efficient because the average connection time of the SRW device is lower than what the reentry policy of the LRW device might allow. In other words, if the reset period is just slightly longer than the timeout period of the LRW device, the LRW device can reenter the subscription zone right after its exit. This will reduce the time lapse between successive service cycles and allow the LRW device to maximize the number service periods over a finite period of time.

To mitigate the issues of under-calibrating and/or over-calibrating the reset period, the SRWN device (e.g., the SRWN device 120 or the SRWN device 320) can introduce multiple auxiliary incitation signals during or within each of the reset periods. In general the processes for generating, transmitting, and concealing the multiple auxiliary incitation signals are substantially the same as the incitation signal. For instance, each of the auxiliary incitation signals can be generated by incorporating an auxiliary subscription identifier that is associated with or recognized under a subscription service. Although the auxiliary subscription identifier may share a similar data structure with the subscription identifier, the auxiliary subscription identifier is globally unique and thus distinctive from the subscription identifier. Like the incitation signal $I_A$, each auxiliary incitation signal can be generated by modeling from a conventional advertising signal (e.g., an iBeacon signal). Moreover, each auxiliary incitation signal may include additional data fields for specifying one or more service parameters to the LRW device. These service parameters typically follow those as included in the incitation signal $I_A$.

Figure 2E:
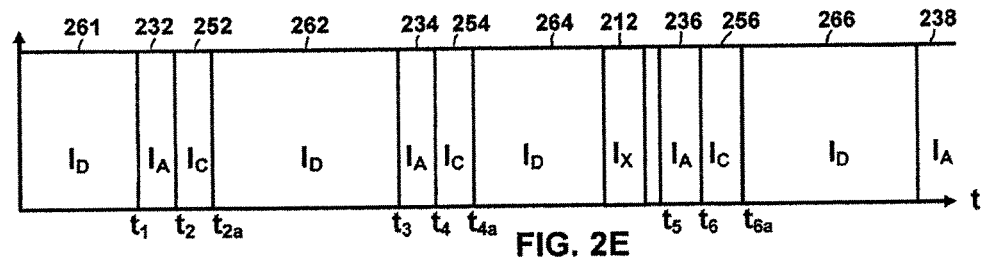
FIG. 2E shows an example of alternating incitation signal and auxiliary incitation signals generated and transmitted by a short-range wireless device according to another aspect of the present disclosure.

As shown in FIG. 2E, for example, the output $N_D(t)$ of an auxiliary SRWN device (e.g., the SRWN device 120 or the SRWN device 320) emits a first auxiliary incitation signal $I_C$ and a second auxiliary incitation signal $I_D$ periodically within or during successive reset periods. Each of the auxiliary incitation signals $I_C$ and $I_D$ has a transmission interval. In one implementation, for example, $t_{2a} < t < t_4$ is the transmission interval between the first auxiliary incitation signals $I_C$ 252 and 254, $t_{4a} < t < t_6$ is the transmission interval between the first auxiliary incitation signals $I_C$ 254 and 256, and so forth. In another implementation, for example, $t_1 < t < t_{2a}$ is the transmission interval between the second auxiliary incitation signals $I_D$ 261 and 262, $t_3 < t < t_{4a}$ is the transmission interval between the second auxiliary incitation signals $I_D$ 262 and 264, $t_5 < t < t_{6a}$ is the transmission interval between the second auxiliary incitation signals $I_D$ 264 and 266, and so forth.

The transmission interval of each auxiliary incitation signal is calibrated to dynamically track the reentry policy of the LRW device. In the event that the SRWN device does not have sufficient data to approximate or predict the LRW device's reentry policy, the reset period is calibrated to a sufficient high value to ensure that the LRW device will exit or leave the subscription zone (e.g., the subscription zone $S_ZA$) by the time the reset period is over. This approach can generally resolve the issue of under-calibrating the reset period. To prevent over-calibration of the reset period, the transmission interval of each auxiliary incitation signal can be calibrated at a value that is less than the reset period for approximating the potential timeout periods of the LRW device. For instance, if the reset period is calibrated at 20 minutes, the transmission interval of the first auxiliary incitation signal $I_C$ can be 15 minutes whereas the transmission interval of the second auxiliary incitation signal $I_D$ can be 10 minutes. When the LRW device receives an incitation signal with a different subscription identifier, the LRW device will determine that it has entered a different subscription zone. Thus, in the example as shown in FIG. 2E, the LRW device is incited three times within each service cycle that is initiated by the incitation signal $I_A$. For each instance of being incited, the LRW device will allocate an additional service period to the corresponding background thread. This is because the LRW device recognizes the entry of a new subscription zone even though the LRW device remains in the same physical boundary of the initial subscription zone (e.g., subscription zone $S_ZA$). With the help of multiple auxiliary incitation signals, an SRW device (e.g., the SRW device 110) may have access to additional service periods within a service cycle of the LRW device, thereby improving the overall efficiency of the connection service of the LRW device.

Although FIG. 2E shows that two auxiliary incitation signals $I_C$ and $I_D$ are transmitted within or during each reset period, other implementations can be viable for dynamically tracking the reentry policy of the LRW device. In one implementation, for example, the SRWN device can transmit more than two auxiliary incitation signals within or during each reset period. In another implementation, for example, the SRWN device can transmit the first auxiliary incitation signal $I_C$ multiple times within or during a reset period. In yet another implementation, for example, the SRWN device can transmit the second auxiliary incitation signal $I_D$ within or during every other reset period.

According to an aspect of the present disclosure, the SRWN device can preserve a set of emergent subscription identifiers for handling emergency requests from one or more SRW devices. Like the regular subscription identifiers (i.e., the subscription identifiers and the auxiliary subscription identifiers), each of the emergent subscription identifiers is globally unique, and each of them is associated with or recognized under a connection service subscribed by an LRW device. The SRWN device can generate one or more emergent incitation signals upon receiving an emergency requests from a peer SRW device or upon determining that an emergent connection is needed.

In one implementation, the SRWN device may receive an emergency request from a peer SRW device that performs the specific function of smoke detecting. When the peer SRW device detects a substantial amount of smoke building up within a dwelling, the SRW device will send an emergency request to the SRWN device. Responding to the emergency request, the SRWN device will generate an emergent incitation signal based on one of the emergent subscription identifiers. In another implementation, the SRWN device may on its own initiative, determine that a particular connection request from a peer SRW device is of high priority. For example, the SRWN device may on its own initiative, determine that a particular connection request is of high priority when it is made repeatedly by a nearby wireless device, such as the LRW device 140. Upon making such a determination, the SRWN device will generate an emergent incitation signal based on one of the emergent subscription identifiers.

The transmission of the emergent incitation signal, however, does not have to follow the alternate pattern of the regular incitation signals (i.e., the incitation signal $I_A$ and the auxiliary incitation signals $I_B$, $I_C$, and $I_D$). As shown in FIGS. 2A-2E, the transmission of the emergent incitation signal $I_X$ has its own alternating pattern, and it can begin within or during any notification period and/or reset period of the regular incitation signals. An LRW device receiving an emergent incitation signal may commence a service cycle that is different from the service cycle initiated by the incitation signal $I_A$ as long as the LRW device remains within the physical boundary of the subscription zone $S_ZA$.

So far, the SRW device (e.g., the SRW device 110) and the SRWN device (e.g., the SRWN device 120 or the SRWN device 320) are described as two separate devices. In this particular system (e.g., the local communication system 102), the SRWN device is responsible for generating and transmitting the incitation signal so as to incite an LRW device (e.g., the LRW device 140) to provide the subscribed service. The LRW device does not provide connection service to the SRWN device however, as the SRWN device will not respond to the scan request of the LRW device.

In an alternative implementation, the hardware and software of the SRWN device can be incorporated to the SRW device to form a single device. In this alternative implementation, the memory 114 assumes the additional storage responsibilities of the memory 124, whereas the processor circuitry 116 assumes the additional processing responsibilities of the processor circuitry 126. To that end, the processor circuitry 116 of the SRW device 110 is configured to perform the functions of generating, transmitting, and concealing one or more incitation signals, which include the incitation signals $I_A$, $I_B$, $I_C$, $I_D$, and $I_X$ as shown in FIGS. 2A-2E. In this alternative implementation, an LRW device (e.g., the LRW device 140) provides connection service to the SRW device that generates and transmits the incitation signals.

Figure 4A:
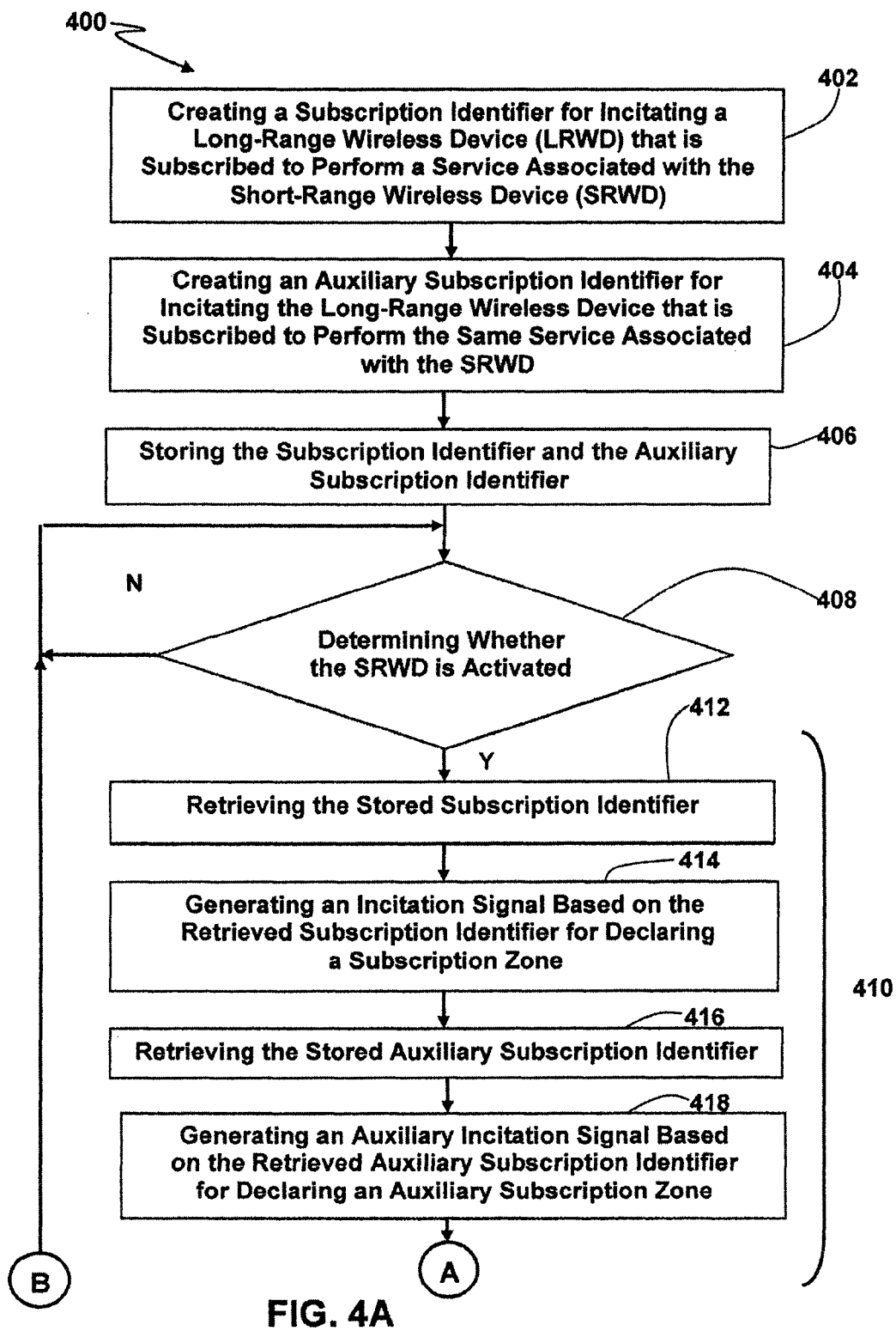
FIGS. 4A-4C show an exemplary flow chart of a method performed by a short-range wireless device for use in a remote communication system according to one aspect of the present disclosure.
Figure 4B:
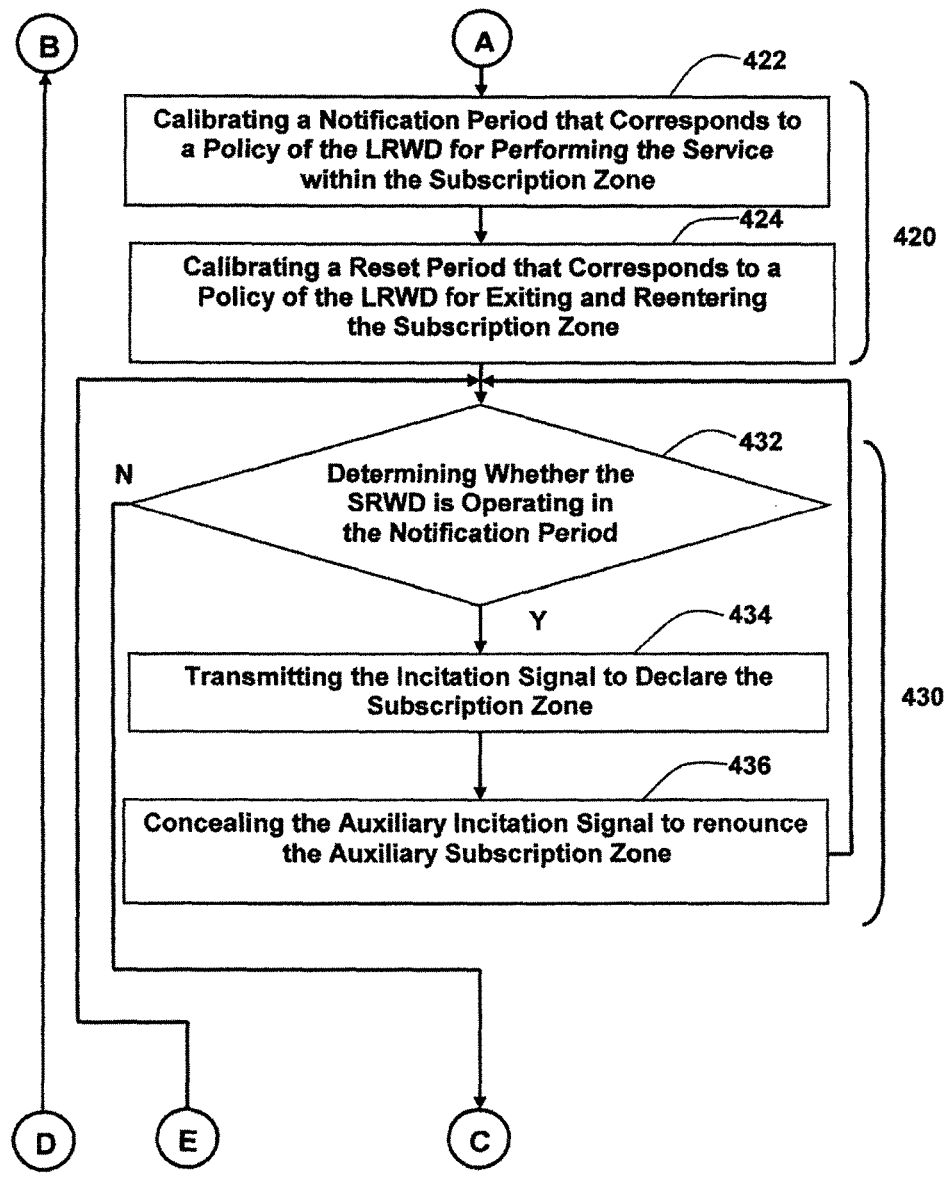
Figure 4C:
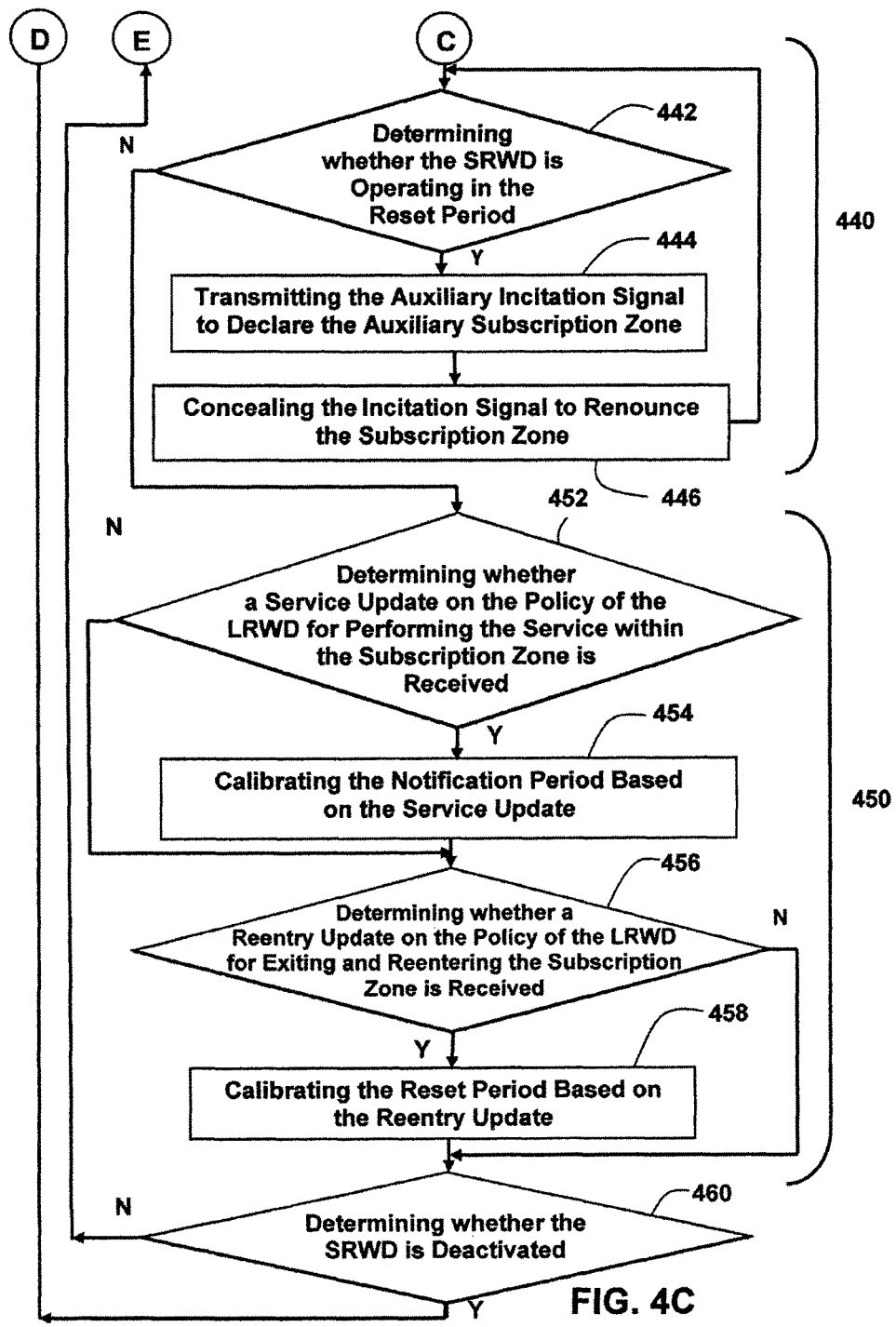
Figure 5A:
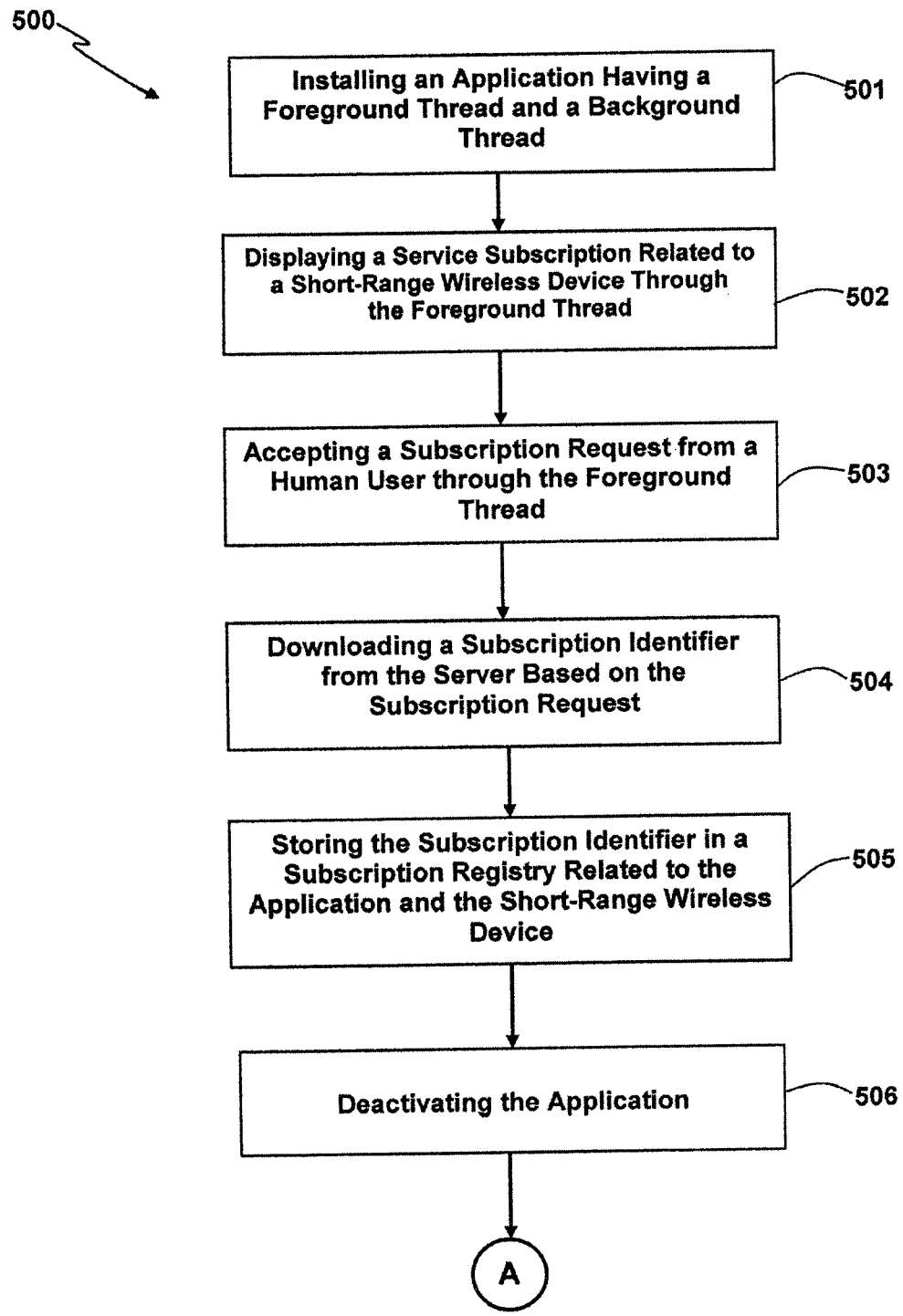
FIGS. 5A-5E show an exemplary flow chart of a method performed by a long-range wireless device for use in a remote communication system according to one aspect of the present disclosure.
Figure 5B:
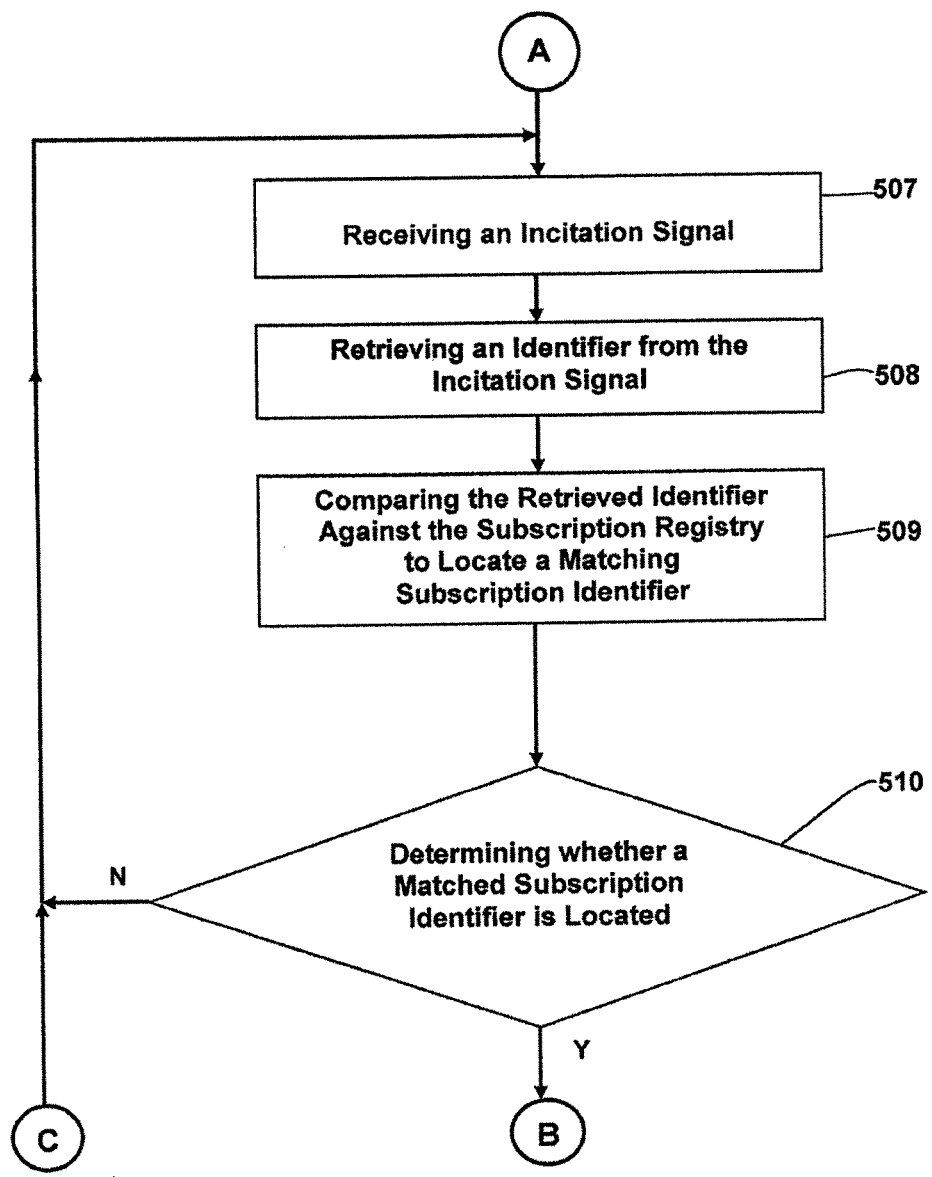
Figure 5C:
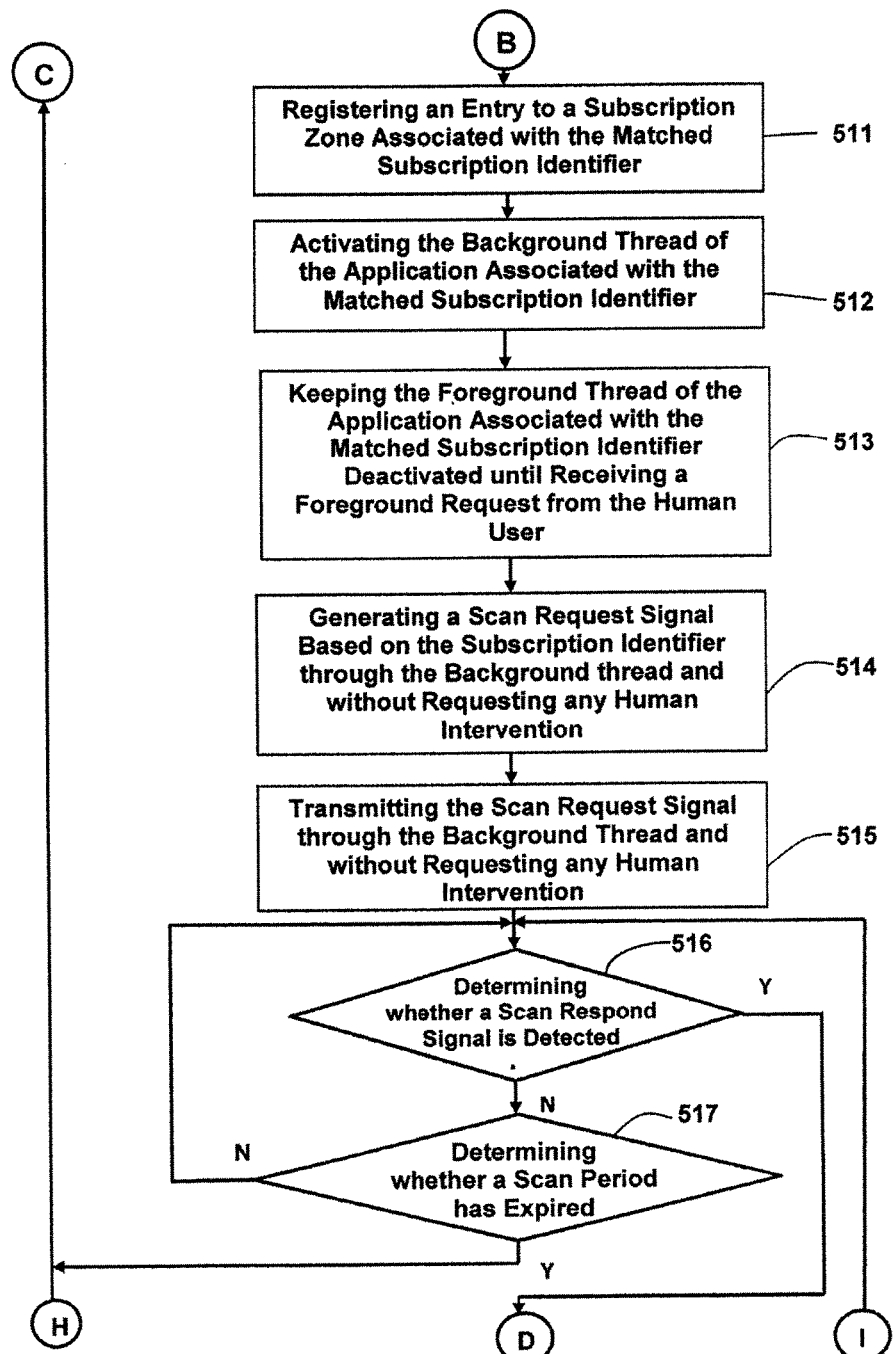
Figure 5D:
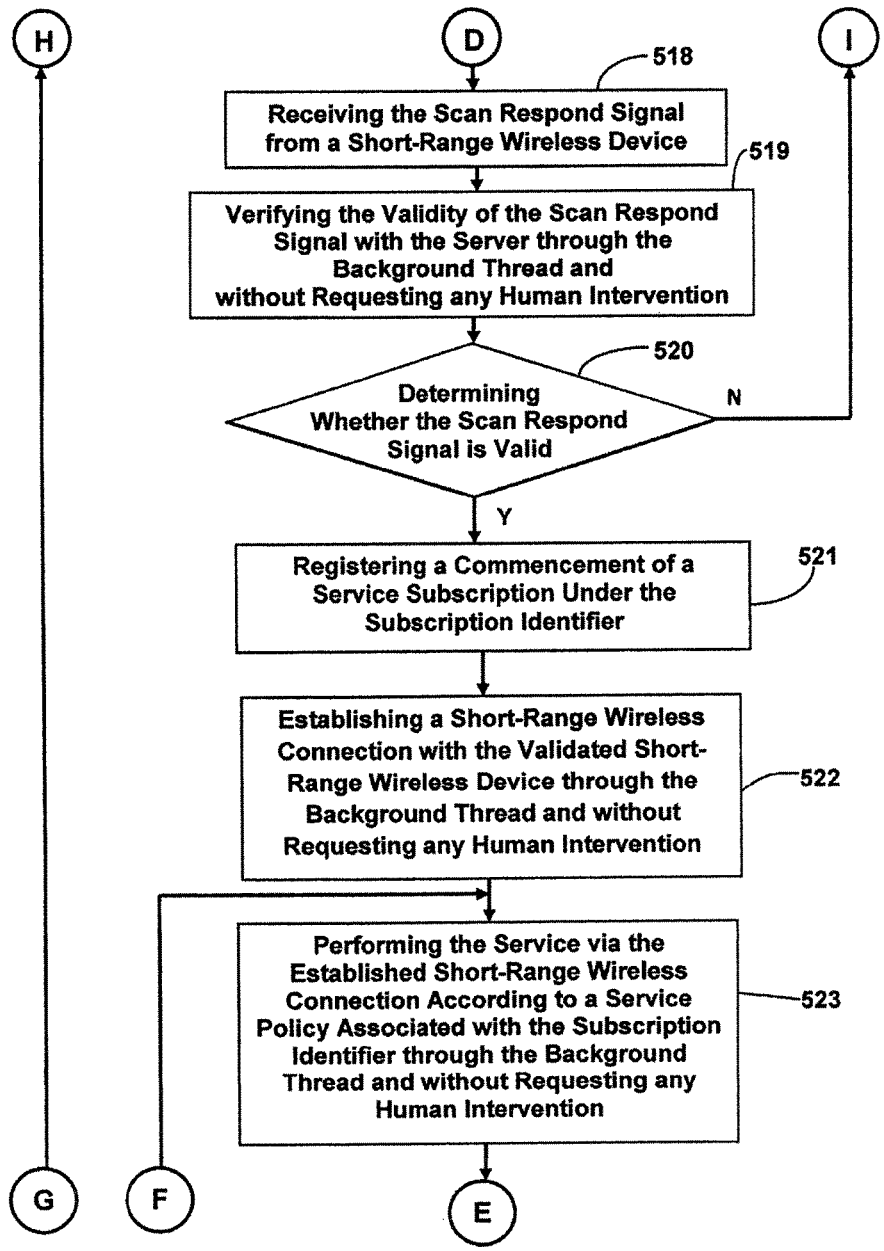
Figure 5E:
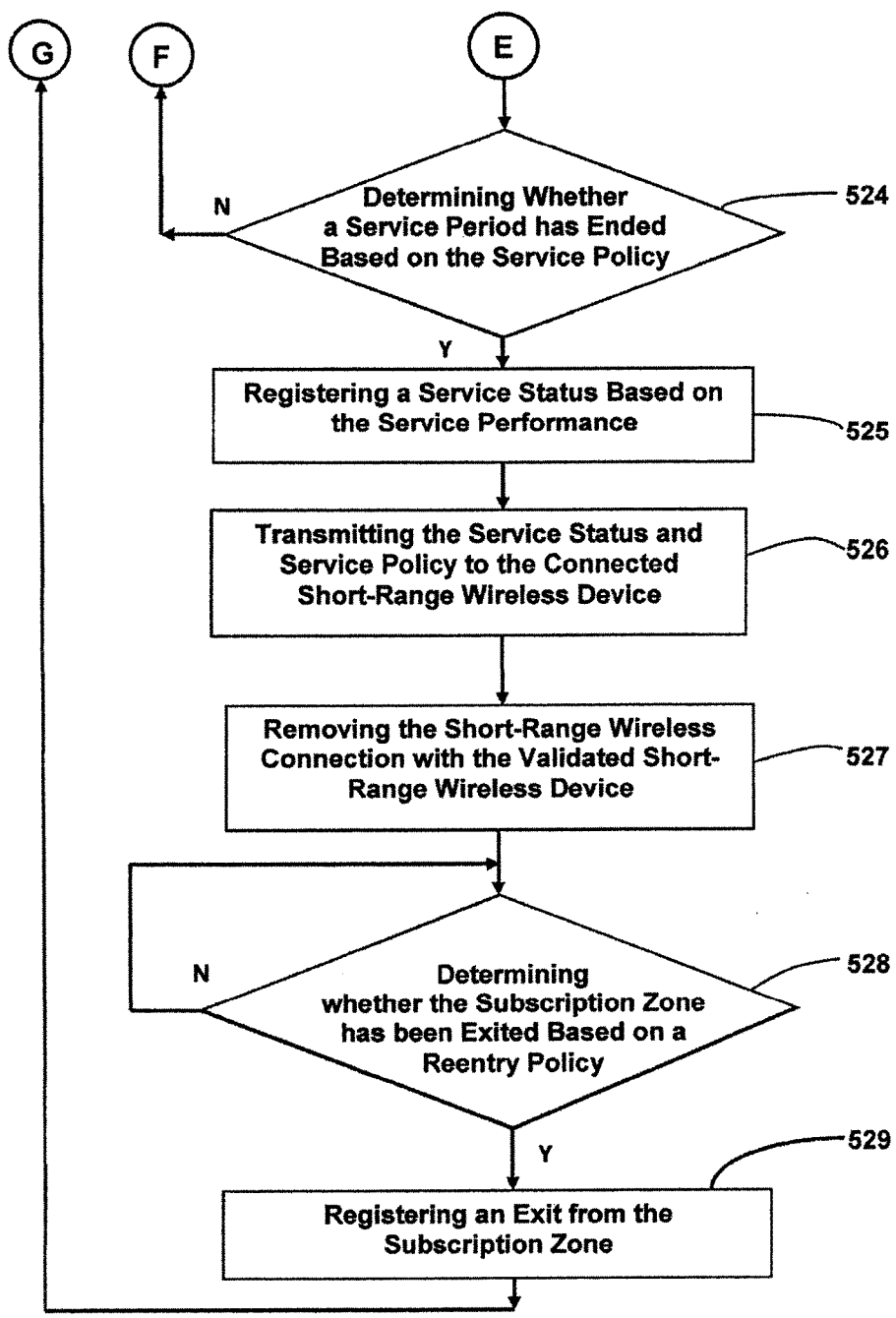

FIGS. 4A-4C show an exemplary flow chart of a method 400 performed by a short-range wireless device (SRWD) for use in a remote communication system. The SRWD can be the SRWN device (e.g., 120 and 320) as shown in FIG. 1 and FIGS. 3A-3C, or it can be the SRW device (e.g., 110) incorporating the functional features of the SRWN device. While the flow chart as shown in FIGS. 4A-4C includes additional and/or alternative features of the SRWD, these features should be understood and implemented in a manner that is consistent with the disclosure of regarding FIGS. 1, 2A-2E, and 3A-3C.

Moreover, the method 400 can be translated to a set of programming instructions, which can be stored in a non-transitory computer-readable medium (e.g., the memory 114 or the memory 124). Upon compiling and/or executing such programming instructions, the SRWD can perform one or more steps of the method 400. Depending on the particular implementation, the SRWD may include one or more data processing means (e.g., the processor circuitry 116 or 126) and data communication means (e.g., the SRTX 118 or 128) to perform each of these method steps.

Depending on the particular mode of operation, the method 400 may begin at any one of the disclosed steps. In one implementation, for example, the method 400 begins at step 402, in which the SRWD creates a subscription identifier for inciting a long-range wireless device that is subscribed to perform a service associated with the short-range wireless device. Alternatively, the subscription identifier can be created by other entities, which include but are not limited to the manufacturer of the SRWD device, a peer SRWD device, or an application server, such as the application server 160.

In step 404, the SRWD creates an auxiliary subscription identifier for inciting the long-range wireless device that is subscribed to perform the same service associated with the short-range wireless devices. Alternatively, the auxiliary subscription identifier can be created by other entities, which include but are not limited to the manufacturer of the SRWD device or an application server, such as the application server 160.

In step 406, the SRWD stores the subscription identifier and the auxiliary subscription identifier in a memory regardless of whether these identifiers are created locally by the SRWD or received from other entities. Depending on the particular implementation, the memory can be an internal memory (i.e., the memory 114 or the memory 124) or an external memory (not shown) accessible by the SRWD.

In step 408, the SRWD determines whether the SRWD is activated. The SRWD is activated if it receives a connection request from a preauthorized peer SRWD or when it determines that a connection service is needed for sending internal data to an application server. If the SRWD is activated, the SRWD will initiate a procedure 410 for generating one or more incitation signals. Otherwise, the SRWD will remain in step 408 until it becomes activated.

The procedure 410 includes steps 412 to steps 418. In step 412, the SRWD retrieves the stored subscription identifier. In step 414, the SRWD generates an incitation signal based on the retrieved subscription identifier for declaring a subscription zone. In step 416, the SRWD retrieves the stored auxiliary subscription identifier. In step 418, the SRWD generates an auxiliary incitation signals based on the retrieved auxiliary subscription identifier for declaring an auxiliary subscription zone. Depending on the particular implementation, the SRWD may generate multiple auxiliary incitation signals as described in association with FIG. 2E to optimize the connection service. Although the incitation signal and the auxiliary incitation signal are generated within the procedure 410, they will not be transmitted until later. As such, the subscription zone and the auxiliary subscription zone are not declared during the procedure 410.

After the SRWD performs the procedure 410, it may initiate procedure 420 for calibrating a notification period and a reset period if these two parameters have not yet been set or if the SRWD receives any update regarding these two parameters. The procedure 420 includes steps 422 and 424. In step 422, the SRWD calibrates the notification period that corresponds to a policy of the long-range wireless device for performing the service within the subscription zone. The calibration of the notification period tracks the service period offered by the long-range wireless device. In step 424, the SRWD calibrates that reset period that corresponds to a policy of the long-range wireless device for exiting and reentering the subscription zone. The calibration of the reset period tracks the timeout period imposed by the long-range wireless device.

After the SRWD performs the procedure 420, the SRWD will initiate procedure 430 for performing one or more operations during the notification period. The procedure 430 includes steps 432 to 436. In step 432, the SRWD determines whether the SRWD is operating in the notification period. As an example, the SRWD can count down the notification period to make such a determination. If the SRWD is operating in the notification period, the SRWD will moves to steps 434 and 436. If the notification period has ended, the SRWD device will move on to the next procedure.

In step 434, the SRWD transmits the incitation signal to declare the subscription zone. In step 436, the SRWD conceals the auxiliary incitation signal to renounce the auxiliary subscription zone if the auxiliary subscription zone has been previously declared. The concealment of the auxiliary incitation signal can be achieved in one of the several ways as described above. Depending on the particular implementation, the structural means for performing steps 434 and 436 may include a processor circuitry (e.g., the processor circuitry 116 or 126) and a short-range transceiver (e.g., the SRTX 118 or 128). After performing step 436, the SRWD will return to step 432 to determine whether or not the notification has expired.

After a notification period has expired, the SRWD initiates a procedure 440 for performing one or more operations during the reset period. The procedure 440 includes steps 442 to 446. In step 442, the SRWD determines whether the SRWD is operating in the reset period. As an example, the SRWD can count down the reset period to make such a determination. If the SRWD is operating in the reset period, the SRWD will moves to steps 444 and 446. If the reset period has ended, the SRWD device will move on to the next procedure.

In step 444, the SRWD transmits the auxiliary incitation signal to declare the auxiliary subscription zone. Depending on the particular implementation, the SRWD may transmit multiple auxiliary incitation signals as described in association with FIG. 2E to optimize the connection service. In step 446, the SRWD conceals the incitation signal to renounce the subscription zone if the subscription zone has been previously declared. The concealment of the incitation signal can be achieved in one of the several ways as described above. Depending on the particular implementation, the structural means for performing steps 444 and 446 may include a processor circuitry (e.g., the processor circuitry 116 or 126) and a short-range transceiver (e.g., the SRTX 118 or 128). After performing step 446, the SRWD will return to step 442 to determine whether or not the notification has expired.

After a reset period has expired, the SRWD initiates a procedure 450 for updating the notification period and/or the reset period. The procedure 450 includes steps 452 to 458. In step 452, the SRWD determines whether a service update on the service policy of the LRWD is received. The SRWD can receive the service update from the LRWD or from a peer SRWD connected with the LRWD. If the SRWD does not receive any service update, the SRWD will move on to step 456. Otherwise, the SRWD performs step 454, in which the SRWD calibrates the notification period based on the service update, thereby tracking the service policy of the LRWD.

In step 456, the SRWD determines whether a timeout update on the policy of the LRWD for exiting the subscription zone is received. The SRWD can receive the timeout update from the LRWD or from a peer SRWD connected with the LRWD. If the SRWD does not receive any timeout update, the SRWD will move on to step 460. Otherwise, the SRWD performs step 458, in which the SRWD calibrates the reset period based on the timeout update, thereby tracking the reentry policy of the LRWD.

In step 460, the SRWD determines whether the SRWD is deactivated. The SRWD is deactivated if it has stopped receiving connection requests from any of the preauthorized peer SRWDs. This may happen either when the connection requests of the peer SRWDs have been fulfilled or when the peer SRWDs have moved out of the physical boundary of the subscription zone of the SRWD. Alternatively, the SRWD is deactivated when it determines that the connection service is no longer needed for sending internal data to an application server. This may happen when the SRWD has successfully sent the internal data to the application server. If the SRWD is deactivated, the SRWD will return to step 408, in which the SRWD will wait for another round of activation. Otherwise, the SRWD will return to step 432, in which the SRWD will re-initiate procedure 430 for performing one or more operations during the notification period.

The purpose of performing method 400 is to incite a long-range wireless device to establish a short-range wireless communication channel with the SRWD. Once the long-range wireless device is incited, it will perform a mutual authentication process with SRWD before establishing the short-range wireless communication channel (e.g., the local communication 134). And after the short-range wireless communication channel is established, the SRWD can communicate with a server by applying an encryption process.

FIGS. 5A-5E show an exemplary flow chart of a method 500 performed by a long-range wireless device (LRWD) for use in a remote communication system. The LRWD can be the LRW device (e.g., 140 and 340) as shown in FIG. 1 and FIGS. 3A-3C. While the flow chart as shown in FIGS. 5A-5E includes additional and/or alternative features of the LRWD, these features should be understood and implemented in a manner that is consistent with the disclosure of regarding FIGS. 1, 2A-2E, and 3A-3C. Moreover, the method 500 can be translated to a set of programming instructions, which can be stored in a nontransitory computer-readable medium (e.g., the memory 147). Upon compiling and/or executing such programming instructions, the LRWD can perform one or more steps of the method 500. Depending on the particular implementation, the LRWD may include one or more data processing means (e.g., the processor circuitry 146) and data communication means (e.g., the SRTX 142 and/or the LRTX 144) to perform each of these method steps.

Depending on the particular mode of operation, the method 500 may begin at any one of the disclosed steps. In one implementation, for example, the method 500 begins at step 501, in which the LRWD installs an application having a foreground thread and a background thread. In step 502, the LRWD display a service subscription related to a short-range wireless device (SRWD) through the foreground thread of the application. The service subscription allows the LRWD to provide short-range wireless connection service and data forwarding service to the SRWD without any supervision or intervention from a human user once the human user has accepted the service subscription. In the event that the human user chooses to accept the service subscription, the LRWD will register the accepted subscription request in step 503 through the foreground thread of the application.

In step 504, the LRWD downloads a subscription identifier from the server based on the subscription request. Depending on the particular implementation, the LRWD may download multiple subscription identifiers or receive the subscription identifiers from another source. Each of the subscription identifiers is globally unique and associated with the service subscription. For each subscription identifier the LRWD downloads or receives, a matching subscription identifier is issued to an SRWD. Then in step 505, the LRWD stores the subscription identifier in a subscription registry related to the application and the SRWD. In one implementation, for example, the LRWD can recognize an application or an SRWD by checking a subscription registry record under a particular subscription identifier.

After storing the subscription identifier, the LRWD deactivates the application in step 506 to conserve energy. If the user of the LRWD does not operate the application after step 506, the background thread and foreground thread of the application will stay deactivated. At the same time, the LRWD will monitor incoming short-range wireless signals to detect an incitation signal. In the event that the LRWD receives an incitation signal in step 507, the LRWD will retrieves an identifier from the incitation signal in step 508. Then, in step 509, the LRWD compares the retrieved identifier against the subscription registry to locate a matching subscription identifier.

In step 510, the LRWD determines whether a matched subscription identifier is located within the subscription registry. In general, the subscription registry includes a record with the matched subscription identifier if the user of the LRWD has previously accepted a subscription service that is associated with the matched subscription identifier. If there is a matched subscription identifier, the LRWD will proceed to step 511 to register an entry to a subscription zone that is associated with the matched subscription identifier. On the other hand, if there is no matched subscription identifier, the LRWD will return to step 507 to wait for the next incitation signal.

After registering the entry to the subscription zone, the LRWD proceeds to step 512 to activate the background thread of the application that is associated with the matched subscription identifier. In one implementation, the LRWD may consult the subscription registry to determine which application is associated with the matched subscription identifier. Although each subscription identifier is globally unique, it can be associated with multiple applications. Thus, the LRWD can activate more than one background thread when the matched subscription identifier is associated with more than one application.

By activating the background thread of an associated application, the LRWD initiates a procedure for communicating with a SRWD that is within the proximity of the subscription zone. The LRWD performs the communication procedure autonomously as no input, supervision, or intervention from a human user is required in this procedure. While activating the background thread, the LRWD keeps the foreground thread deactivated in step 513 until receiving a foreground request from the human user.

By running the background thread, the LRWD generates, in step 514, a scan request signal based on the subscription identifier and transmits, in step 515, the scan request signal using a short-range transceiver (e.g., the SRTX 142). Because the foreground thread is not involved during the generation and transmission of the scan request signal, no input, supervision, or intervention from a human user is required. The scan request signal is intended for all preauthorized SRWDs located within the proximity of the subscription zone. In general, the SRWD that wants to be connected will respond to the scan request signal by generating and transmitting a scan response signal.

After transmitting the scan request signal, the LRWD determines whether a scan respond signal is detected in step 516. If the LRWD has not yet detected any scan respond signal, the LRWD will proceed to step 517, in which the LRWD determines whether a scan period has expired. In general, the scan period is an amount of time that the LRWD is willing to for a scan respond signal. If the scan period has expired, the LRWD will return to step 507 to wait for the next incitation signal. But if the scan period has not yet expired, the LRWD will return to step 516 to keep on searching for a scan respond signal. In the event that a scan respond signal is detected in step 516, the LRWD will proceed to step 518, in which the LRWD receives the scan respond signal from a SRWD.

Depending on the particular implementation, the SRWD that transmits the scan respond signal may or may not be the SRWD that transmits the incitation signal. In one implementation, for example, the SRWD that transmits the scan respond signal is the same SRWD that transmits the incitation signal when the SRWD acts as an application specific device (e.g., a BLE temperature logger or a BLE water meter) as well as a nudging device (e.g., the SRWN 120 or the SRWN 320). In another implementation, for example, the SRWD that transmits the scan respond signal is a peer of the SRWD that transmits the incitation signal.

After receiving the scan respond signal, the LRWD verifies, in step 519, the validity of the scan respond signal with the server via a remote communication channel, such as the remote communication channel 136. The verification process is performed through the background thread, and thus it does not require any human supervision or intervention. Alternatively, the verification process can be performed without the server. In one implementation, for example, the LRWD can rely on a set of preinstalled parameters for verifying the validity of the scan respond signal.

If the LRWD determines that the scan respond signal is invalid in step 520, the LRWD will return to step 516 to keep on searching for a scan respond signal. However, if the LRWD determines that the scan respond signal is invalid in step 520, the LRWD will proceed to step 521, in which the LRWD registers a commencement of a service that is subscribed by a user and associated with the corresponding subscription identifier. This marks the beginning of a service cycle, which generally includes a service period and a timeout period. In step 522, the LRWD establishes a short-range wireless connection with the validated SRWD through the background thread and without requesting any human intervention.

Next in step 523, the LRWD performs the service via the established short-range-wireless connection according to a service policy associated with the subscription identifier. Because the service is performed using the background thread, the LRWD does not request any human supervision or intervention. The service specified in a service policy may vary from application to application. In one implementation, for example, the service policy may specify the service to include establishing a secured data path between the SRWD and a designated server, such as the server 160. In another implementation, for example, the service policy may specify the service to include relaying data from the SRWD to the dedicated server.

In step 524, the LRWD determines whether a service period has ended based on a service policy. Depending on the particular implementation, the service policy may specify a fixed service period, a variable service period, or a combination of both. Therefore, the duration of the service period can be application specific in some instances. If the service period has not yet ended, the LRWD will return to step 523 to keep on performing the service. However, if the service period has ended, the LRWD will proceed to step 525, in which the LRWD registers a service status based on the service performance. In one implementation, for example, the LRWD can register the data transmission status reporting the percentage of remaining data that needs to be transmitted from the SRWD to the server. In another implementation, for example, the LRWD can register the average throughput of the short-range wireless communication for statistical and/or billing purpose. In yet another implementation, for example, the LRWD can register a completion status if the LRWD manages to complete the entire service within the service period.

After registering the service status, the LRWD transmits, in step 526, the service status and service policy to the connected SRWD. This transmission allows the SRWD to keep track of the progress of the requested service as well as the service period specified in the service policy. Then, the LRWD proceeds to step 527, in which the LRWD removes the short-range wireless connection with the validated SRWD.

Upon terminating the connection with the SRWD, the LRWD determines in step 528 whether the LRWD has exited the subscription zone based on a reentry policy. Depending on the particular implementation, the reentry policy may specify a timeout period for determining whether LRWD has exited the subscription zone. For instance, the LRWD can determine the exit of a subscription zone if the LRWD has not received the corresponding incitation signal for a period exceeding the timeout period. Thus, the LRWD can determine a subscription zone exit when the LRWD leaves the physical boundary of the subscription zone and/or when the SRWD conceals the corresponding incitation signal.

Also depending on the particular implementation, the reentry policy may specify a fixed timeout period, a variable timeout period, or a combination of both. Therefore, the duration of the timeout period can be application specific in some instances. Optionally, the LRWD can communicate the reentry policy to the SRWD in step 526 to allow the SRWD to track the timeout period for the next service cycle.

If the LRWD determines that it is still in the subscription zone, the LRWD will return to step 528, in which the LRWD waits for the exit of the subscription zone. If, on the other hand, the LRWD determines that it has exited the subscription zone, the LRWD will proceed to step 529, in which the LRWD registers an exit from the subscription zone. This marks the completion of a service cycle, at which point the LRWD returns to step 507 to wait for the next incitation signal.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the methods and/or operations described (such as a program encoded in a computer-readable medium, which can be a memory device, a storage device, a machine-readable storage substrate, or other physical, machine-readable medium, or a combination of one or more of them).

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results unless such order is recited in one or more claims. In certain circumstances, multitasking and parallel processing may be advantageous. Moreover, the separation of various system components in the embodiments described above should not be understood as requiring such separation in all embodiments.

What is claimed is:

1. A short-range wireless device comprising:
 a memory configured to store a subscription identifier used to cause a long-range wireless device that is subscribed to establish a data path between a server and the short-range wireless device; and
 a processor circuitry coupled with the memory, and configured to:
  generate an incitation signal based on the subscription identifier, the incitation signal identifying a subscription zone of the short-range wireless device,
  direct a short-range transceiver to transmit the incitation signal to the long-range wireless device, during a notification period, to cause the long-range wireless device to establish the data path between the server and the short-range wireless device, and
  conceal the incitation signal, from the long-range wireless device and during a reset period, to cause a logical exit of the long-range wireless device from the subscription zone while the long-range wireless device is physically within the subscription zone of the short-range wireless device, the reset period being distinctive from and alternating with the notification period.

2. The short-range wireless device of claim 1, wherein the processor circuitry is configured to:
cause the long-range wireless device to establish, through a background thread, a data path between the server and a peer short-range wireless device located within a proximity of the subscription zone; and
cause the long-range wireless device to relay, through the background thread, data from the peer short-range wireless device to the server via the established data path between the server and the peer short-range wireless device.

3. The short-range wireless device of claim 1, wherein the processor is configured to:
cause the long-range wireless device to establish, through a background thread, the data path between the server and the short-range wireless device; and
cause the long-range wireless device to relay, through the background thread, data from the short-range wireless device to the server via the established data path between the server and the short-range wireless device.

4. The short-range wireless device of claim 1, wherein to conceal the incitation signal the processor circuitry is configured to stop transmission of the incitation signal.

5. The short-range wireless device of claim 1, wherein the reset period is calibrated to track a policy of the long-range wireless device for exiting and reentering the subscription zone.

6. The short-range wireless device of claim 1, wherein the notification period is calibrated to track a policy of the long-range wireless device within the subscription zone.

7. The short-range wireless device of claim 1, wherein:
the memory is configured to store an auxiliary subscription identifier used to cause the long-range wireless device that is subscribed to establish the data path between the server and the short-range wireless device during the reset period;
the processor circuitry is an application-specific integrated circuit (ASIC) configured to:
generate an auxiliary incitation signal based on the auxiliary subscription identifier, wherein the auxiliary incitation signal identifies an auxiliary subscription zone of the short-range wireless device, and
direct the short-range transceiver to transmit the auxiliary incitation signal during the reset period, and
conceal the auxiliary incitation signal during the notification period; and
the auxiliary subscription zone spatially overlaps with the subscription zone.

8. The short-range wireless device of claim 7, wherein:
the auxiliary subscription identifier is a first auxiliary subscription identifier;
the memory is configured to store a second auxiliary subscription identifier;
the processor circuitry is configured to generate the auxiliary incitation signal including a first auxiliary incitation signal based on the first auxiliary subscription identifier and a second auxiliary incitation signal based on the second auxiliary subscription identifier, and direct the short-range transceiver to transmit the first auxiliary incitation signal at a first interval and the second auxiliary incitation signal at a second interval; and the first and second intervals are calibrated to dynamically track a policy of the long-range wireless device for exiting and reentering the subscription zone.

9. A nontransitory computer-readable medium storing a set of instructions to cause a short-range wireless device to perform operations comprising:
retrieving a subscription identifier that is used to cause a long-range wireless device that is subscribed to establish a data path between a server and the short-range wireless device;
generating an incitation signal that identifies a subscription zone based on the subscription identifier;
transmitting the incitation signal to the long-range wireless device, during a notification period, to cause the subscribed long-range wireless device to establish the data path between the server and the short-range wireless device; and
halting the incitation signal, from the long-range wireless device and during a reset period, to cause a logical exit of the long-range wireless device from the subscription zone while the long-range wireless device is physically within the subscription zone of the short-range wireless device, the reset period being distinctive from and alternating with the notification period to periodically renounce the subscription zone.

10. The nontransitory computer-readable medium of claim 9, wherein the operations further comprise:
causing the long-range wireless device to establish, through a background thread, a data path between the server and a peer short-range wireless device located within a proximity of the subscription zone; and
causing the long-range wireless device to relay, through the background thread, data from the peer short-range wireless device to the server via the established data path between the server and the peer short-range wireless device.

11. The nontransitory computer-readable medium of claim 9, wherein the operations further comprise:
causing the long-range wireless device to establish, through a background thread, the data path between the server and the short-range wireless device; and
causing the long-range wireless device to relay, through the background thread, data from the short-range wireless device to the server via the established data path between the server and the short-range wireless device.

12. The nontransitory computer-readable medium of claim 9, wherein the reset period is calibrated to track a policy of the long-range wireless device for exiting and reentering the subscription zone.

13. The nontransitory computer-readable medium of claim 9, wherein the notification period is calibrated to track a policy of the long-range wireless device within the subscription zone.

14. The nontransitory computer-readable medium of claim 9, wherein the operations further comprise:
retrieving an auxiliary subscription identifier used to cause the long-range wireless device that is subscribed to establish the data path between the server and the short-range wireless device during the reset period;
generating an auxiliary incitation signal based on the auxiliary subscription identifier;
transmitting the auxiliary incitation signal during the reset period to periodically identify an auxiliary subscription zone within a proximity of the subscription zone; and
halting the auxiliary incitation signal during the notification period to periodically renounce the auxiliary subscription zone.

15. The nontransitory computer-readable medium of claim 14, wherein
retrieving the auxiliary subscription identifier includes retrieving a first auxiliary subscription identifier and a second auxiliary subscription identifier, each used to cause the long-range wireless device that is subscribed to establish the data path between the server and the short-range wireless device during the reset period,
generating the auxiliary incitation signal includes generating a first auxiliary incitation signal based on the first auxiliary subscription identifier and a second auxiliary incitation signal based on the second auxiliary subscription identifier, and
transmitting the auxiliary signal includes transmitting the first auxiliary incitation signal at a first interval and the second auxiliary incitation signal at a second interval, wherein the first and second intervals are calibrated to dynamically track a policy of the long-range wireless device for exiting and reentering the subscription zone.

16. A nontransitory computer-readable medium storing a set of instructions to cause a long-range wireless device to perform operations for establishing a data path between a server and the short-range wireless device, the operations comprising:
receiving an incitation signal that identifies a subscription zone via a short-range transceiver of the long-range wireless device that is located within the subscription zone and subscribed to establish the data path between the server and the short-range wireless device;
retrieving an identifier from the incitation signal;
comparing the retrieved identifier against a subscription registry associated with the short-range wireless device;
autonomously communicating with the short-range wireless device via the short-range transceiver if and only if the subscription registry includes a subscription identifier matching with the retrieved identifier;
logically entering, during a notification period, the subscription zone to establish the data path between the server and the short-range wireless device; and
logically exiting the subscription zone, during a reset period and while the long-range wireless device is physically within the subscription zone of the short-range wireless device, to prevent the long range wireless device from expiring the subscription zone.

17. The nontransitory computer-readable medium of claim 16, wherein the operations further comprise:
deactivating an application registered with the subscription identifier before receiving the incitation signal.

18. The nontransitory computer-readable medium of claim 17, wherein autonomously communicating includes:
activating a background thread of the application while keeping a foreground thread of the application deactivated upon locating the matching subscription identifier in the subscription registry;
transmitting, through the background thread, a scan request signal via the short-range transceiver; and
establishing, through the background thread, a short-range wireless connection with the short-range wireless device upon detecting a valid scan respond signal transmitted from the short-range wireless device.

19. The nontransitory computer-readable medium of claim 16, wherein autonomously communicating includes:
locating, in the subscription registry, the subscription identifier matching with the retrieved identifier;
upon the subscription identifier is located, generating a scan request signal without human intervention; and
transmitting the scan request signal via the short-range transceiver.

20. The nontransitory computer-readable medium of claim 19, wherein autonomously communicating includes:
receiving, via the short-range transceiver, a scan respond signal transmitted by the short-range wireless transceiver;
verifying the scan respond signal with the server via a remote connection; and
relaying data from the short-range wireless device to the server if and only if the server validates the scan respond signal.

\* \* \* \* \*